United States Patent [19]

Tohmon et al.

[11] Patent Number: 5,426,656
[45] Date of Patent: Jun. 20, 1995

[54] LASER ELEMENT DOPED WITH RARE EARTH IONS, OPTICAL AMPLIFIER ELEMENT DOPED WITH RARE EARTH IONS AND RARE-EARTH-ION-DOPED SHORT-WAVELENGTH LASER LIGHT SOURCE APPARATUS

[75] Inventors: Genji Tohmon; Jun Ohya; Hisanao Sato; Tomoaki Uno, all of Osaka, Japan

[73] Assignee: Matsushita Electric Industrial Co., Ltd., Kadoma, Japan

[21] Appl. No.: 184,932

[22] Filed: Jan. 24, 1994

[30] Foreign Application Priority Data

Jan. 25, 1993 [JP] Japan ............... 5-010072
Sep. 20, 1993 [JP] Japan ............... 5-232968

[51] Int. Cl.$^6$ ............................................. H01S 3/14
[52] U.S. Cl. .................................. 372/39; 372/6; 372/69; 372/68
[58] Field of Search ............ 372/6, 40, 41, 92, 69, 372/39

[56] References Cited

U.S. PATENT DOCUMENTS

| | | |
|---|---|---|
| 3,591,517 | 7/1971 | van der Ziel et al. . |
| 3,599,109 | 8/1971 | Guggenheim et al. . |
| 4,347,485 | 8/1982 | Esterowitz et al. . |
| 4,701,928 | 10/1987 | Fan et al. . |
| 4,809,293 | 2/1989 | DeBell et al. . |
| 5,022,040 | 6/1991 | Pollack et al. ............ 372/41 |
| 5,038,353 | 8/1991 | Esterowitz et al. ............ 372/41 |
| 5,042,039 | 8/1991 | Edagawa et al. . |
| 5,088,103 | 2/1992 | Esterowitz et al. . |
| 5,119,230 | 6/1992 | Pfeiffer . |
| 5,131,069 | 7/1992 | Hall et al. . |
| 5,251,062 | 10/1993 | Snitzer et al. ............ 372/40 |
| 5,299,210 | 3/1994 | Snitser et al. ............ 372/41 |
| 5,299,215 | 3/1994 | Thrash et al. ............ 372/41 |
| 5,321,708 | 6/1994 | Tohmon et al. ............ 372/6 |
| 5,337,401 | 8/1994 | Onishi et al. ............ 372/92 |

FOREIGN PATENT DOCUMENTS

| | | |
|---|---|---|
| 0450677 | 10/1991 | European Pat. Off. . |
| 4007495 | 9/1991 | Germany . |
| 63-011546 | 6/1988 | Japan . |
| 2241949 | 9/1991 | United Kingdom . |

Primary Examiner—Léon Scott, Jr.
Attorney, Agent, or Firm—Willian Brinks Hofer Gilson & Lione

[57] ABSTRACT

The optical fiber is doped at the core thereof with Tm ions and Nd ions. When light at a wavelength in a 800-nm band for exciting the Nd ions, is incident upon the optical fiber through an incident portion thereof, the Nd ions emit light at a wavelength in the vicinity of 1,012 μm. Through three excitations by absorption of light emitted from the Nd ions and/or energy transfer from the Nd ions, the Tm ions experience three excitation transitions and reach a third high energy level through first and second high energy levels. Thereafter, the Tm ions experience a radiative transition from the third high energy level, thereby to emit blue light at a wavelength of 480 nm.

36 Claims, 15 Drawing Sheets

LASER ELEMENT DOPED WITH RARE EARTH IONS, OPTICAL AMPLIFIER ELEMENT DOPED WITH RARE EARTH IONS AND RARE-EARTH-ION-DOPED SHORT-WAVELENGTH LASER LIGHT SOURCE APPARATUS

BACKGROUND OF THE INVENTION

The present invention relates to (i) a laser element doped with rare earth ions and an optical amplifier element doped with rare earth ions to be used in the fields of optical communication, optical information processing, light-applied measurements and control thereof and the like in which coherent light is applied, and (ii) a rare-earth-ion-doped short-wavelength laser light source apparatus to be used in the fields of optical information processing, optical measurements, environmental measurements and the like.

Since the 1960's, there have actively been conducted researches and developments on rare earth ions with which an optical material is to be doped, and proposed rare-earth-ion-doped solid-state laser elements which have a variety of arrangements and which oscillate lasers at a variety of wavelengths. Generally, these rare earth ions are excited by a pumping source comprising a flash lamp which has high output power. However, such a flash lamp also emits light at wavelengths which cannot be absorbed by the rare earth ions. This disadvantageously presents the problems that a rare-earth-ion-doped solid-state laser is lowered in output efficiency and that an adverse effect by heat cannot be avoided.

In 1980's, there has been used, as a pumping source, any of lasers and specially semiconductor lasers adapted to oscillate laser in an absorption area inherent in rare earth ions. As the output of such a semiconductor laser becomes higher, the rare-earth-ion-doped solid-state laser is improved in output efficiency and lowered in sizes and cost.

A rare-earth-ion-doped solid-state laser to be excited by a semiconductor laser is represented by a Nd-ion-doped YAG (Yittrium-Aluminum-Garnet) laser which emits light at 1.064 $\mu$m.

FIG. 14 shows the arrangement of a conventional rare-earth-ion-doped solid-state laser. Shown in FIG. 14 are a solid-state laser element 601 comprising YLiF$_4$, an incident portion 602 of the solid-state laser element 601, a light emitting portion 603 of the solid-state laser element 601, an incident lens 604, exciting light 605, laser 606 to be supplied, a pumping source 607 and a light emitting lens 608.

FIG. 15 shows the energy levels and energy transitions of Tm (thulium) ions with which the solid-state laser element 601 was doped. Shown in FIG. 15 are a level transition 651 due to light absorption, a nonradiative transition 652 due to phonon emission, a radiative transition 653 due to light emission and energy levels 654, 655, 656, 657. The ordinate 658 shows the energy in unit cm$^{-1}$ (Kayser).

As shown in FIG. 14, the exciting light 605 at an optical wavelength of 795 nm oscillated from the pumping source 607, is focussed by the incident lens 604, and the exciting light 605 thus focussed is incident upon the solid-state laser element 601 through the incident portion 602. The Tm ions undergo a change in energy level as shown in FIG. 15. More specifically, upon absorption of the energy discharged from the exciting light 605, the Tm ions experience a transition from the ground state level 654 to the high energy level 656 and also experience the nonradiative transition 652 from the high energy level 656 to the first intermediate level 655. At the first intermediate level 655, the Tm ions emit light at 1.50 $\mu$m and therefore experience a transition from the first intermediate level 655 to the second intermediate level 657. When the Tm ions experience a radiative transition from the first intermediate level 655 to the second intermediate level 657, the Tm ions emit light. The light thus emitted is caused to resonate by reflection films disposed at the incident portion 602 and the light emitting portion 603, and is then emitted, as laser at 1.5 $\mu$m, from the light emitting portion 603.

Conventional solid-state laser elements are mainly of a 3- or 4-level system in which rare earth ions, for example Tm ions, with which an optical material was doped, are excited by exciting light to raise the energy level thereof, after which there is emitted light having an energy level lower than that of the exciting light, i.e., laser at a wavelength longer than that of the exciting light.

However, there are some types of rare earth ions which exhibit a so-called excited-state absorption (ESA) in which the fluorescence lifetime at a high energy level is long and in which the ions are again excited from the high energy level to a higher energy level when the ions are excited by a high output. This higher energy level is higher than the energy level of the exciting light. This enables laser to be oscillated at a wavelength shorter than that of the exciting light. Such excitation to a higher energy level is called upconversion excitation, and a short-wavelength laser element obtained in such a manner is called an upconversion laser element.

As examples of the upconversion laser element, there have been reported a laser element comprising a Ho ion- or Er ion-doped solid-state laser element and adapted to oscillate green light at a 530-nm band, and a laser element comprising a Tm ion- or Pr ion-doped solid-state laser element and adapted to oscillate blue light. These laser elements are discussed, for example, in "Generation of Visible Radiation by Upconversion" written by Aki SHIKIDA et al (Laser Research, Vol. 20, No. 4, 1992).

The upconversion laser element mainly experiences two absorption transitions and therefore requires, as exciting light, two lights at two wavelengths. As reported by Allain et al in "Blue Upconversion Fluorozirconate Fiber Laser", Electron Letters, Vol. 26, p.p. 166–167, 1990, a solid-state laser element doped with Tm ions for example, oscillates blue light at a wavelength of 450 nm to 480 nm because the Tm ions experience a transition of ground-state absorption (GSA) by light at 680 nm and then experience an excited-state absorption transition by light at 650 nm. In this case, a Kr laser is used as the pumping source.

The Kr laser is expensive and requires a large-scale device. Accordingly, when the Kr laser is used as the pumping source, a short-wavelength laser light source apparatus using the Kr laser as the pumping source is considerably limited in industrial applicability.

It has also been proposed an upconversion element in which Tm ions are excited by lights at three wavelengths to oscillate light at 480 nm. This is reported in "CW Room-Temperature Blue Upconversion Fibre Laser", S. G. Grubb, K. W. Bennett, R. S. Cannon and W. F. Humer Electronics Letters, Vol. 28, No. 13, pp 1243–1244. More specifically, there is used a Nd:YAG solid-state laser to be excited by a semiconductor laser and there are utilized three wavelengths of 1.112 μm, 1.116 μm and 1.123 μm oscillated by the Nd:YAG solid-state laser, so that the Tm ions experience a ground-state absorption transition and two excited-state absorption transitions, thus achieving upconversion.

The following will discuss an upconversion laser element using Tm ions with reference to FIG. 16 showing energy levels of the Tm ions.

Shown in FIG. 16 are an absorption transition 661 of exciting light at 1.12 μm oscillated by a pumping source, a transition 662 due to phonon emission, a radiative transition 663, and energy levels 664, 665, 666, 667, 668, 669, 670. The ordinate 671 shows the energy in unit $cm^{-1}$ (Kayser).

The core of a fluoride-type optical fiber (2 m in length) is doped with 1,000 p.p.m of Tm ions (1 p.p.m refers to a part per million by weight). When exciting light at 1.12 μm is incident upon this optical fiber, the Tm ions undergo the following change in energy level. Upon absorption of the exciting light, the Tm ions experience a transition from the ground state level 664 to the first high energy level 666. Then, the emission of phonon 662 causes the Tm ions to experience a transition to the first intermediate level 665. Then, upon absorption of the same exciting light, the Tm ions experience a transition from the first intermediate level 665 to the second high energy level 668. Then, the emission of phonon 662 causes the Tm ions to experience a transition to the second intermediate level 667. Then, upon absorption of the same exciting light, the Tm ions experience a transition from the second intermediate energy level 667 to the third energy level 669. When the Tm ions experience a transition from the third high energy level 669 to the ground state level 664, the Tm ions emit blue light at 480 nm. The light thus emitted from the Tm ions is caused to resonate by reflection films disposed at the incident portion and the light emitting portion of the optical fiber, and is then oscillated, as laser, from the light emitting portion.

Such conventional rare-earth-ion-doped laser elements present the following problems.

As a first problem, there is not available a high-output pumping source as the pumping source used in each of the conventional rare-earth-ion-doped laser elements for emitting exciting light at 1.12 μm. That is, a usual Nd ion-doped solid-state laser oscillates laser at 1.064 μm. This is because the transition probability of light at 1.064 μm is twice as high as that of light at 1.12 μm. To obtain oscillation of laser at 1.12 μm, it is required to make a special contrivance on a solid-state laser element for oscillating laser at 1.064 μm. For example, provision should be made such that light at a wavelength in the vicinity of 1.12 μm is reflected from the reflection films of a resonator, or that an etalon having a wavelength selectivity is inserted in the resonator. When such provision is made, it is possible to oscillate laser at 1.12 μm. However, the laser is lowered in output, causing the energy contributing to excitation to be insufficient.

As a second problem, to achieve upconversion, there are required at least two exciting lights including one exciting light for ground-state absorption and at least one exciting light for excited-state absorption. Generally, these two exciting lights are to be supplied from two pumping sources. A short-wavelength laser light source apparatus using two pumping sources, becomes inevitably large-scaled and expensive, and is therefore limited in industrial applicability.

As a third problem, to cause at least two lights at different wavelengths to be simultaneously incident upon an optical material doped with rare earth ions, it is required to provide a resonator with a multilayer reflection film mirror from which lights are reflected at a plurality of wavelengths, or to correct the chromatic aberration of the lens system resulting from a difference in wavelength between the exciting lights, or to dispose a complicated optical system. Accordingly, the short-wavelength laser light source apparatus is disadvantageously increased in the number of component elements and cost.

As a fourth problem, rare earth ions are excited by exciting lights at three wavelengths which comprise one wavelength of exciting light for ground-state absorption and two wavelengths of exciting lights for excited-state absorption, and of which absorption wavelength areas overlap one another. Accordingly, in the areas where absorption wavelengths overlap one another, the coefficients of ground-state absorption and excited-state absorption are low to lower the absorption efficiency.

As a fifth problem, there is noted a mode overlap between exciting light and oscillated light due to the cutoff wavelength of the optical fiber. More specifically, when using exciting light at 1.12 μm which is infrared light, the core of the optical fiber must have such dimensions as to match the wavelength of the exciting light such that the optical fiber propagates the exciting light in a single transverse mode with the loss minimized. That is, it is required to set the cutoff wavelength $_c$ of the optical fiber to 0.9 to 1.0 μm. However, when the core of the optical fiber is made in such large dimensions, the optical fiber propagates oscillated light at 480 nm in a multiple transverse mode. This considerably deteriorates the overlap of the propagation mode of the exciting light in the optical fiber on the propagation mode of the oscillated light in the optical fiber. This lowers the efficiency of the output of oscillated light with respect to the output of the exciting light.

SUMMARY OF THE INVENTION

It is a first object of the present invention to provide a solid-state laser element capable of oscillating high-output laser with the use of exciting light from a commercially available semiconductor laser.

It is a second object of the present invention to provide an optical amplifier element capable of providing high gain with the use of exciting light from a commercially available semiconductor laser.

It is a third object of the present invention to provide an economical laser light source apparatus having a simple structure which can achieve upconversion excitation with the use of one exciting light emitted from one pumping source.

To achieve the first object above-mentioned, the present invention provides a first laser element doped with rare earth ions which is made of an optical material doped with Tm ions and other rare earth ions different from the Tm ions and which has an incident portion and a light emitting portion which forms a resonator together with the incident portion; the other rare earth ions being adapted to be excited upon absorption of laser which is oscillated at a wavelength corresponding to the wavelength of light that the other rare earth ions absorb, and which is incident from the incident portion;

the other rare earth ions being adapted to experience a radiative transition from an excited state, thereby to emit light at a wavelength from 1.0 μm to 1.2 μm; the Tm ions being adapted to be brought to (i) a first excited state from a ground state level when the Tm ions absorb light at a wavelength of 1.0 μm to 1.2 μm emitted from the other rare earth ions or when an energy is transferred to the Tm ions from the other rare earth ions as excited, and (ii) a second excited state when the Tm ions at the first excited state absorb light at a wavelength of 1.0 μm to 1.2 μm emitted from the other rare earth ions or when an energy is transferred to the Tm ions at the first excited state, from the other rare earth ions as excited, so that the Tm ions exhibit population inversion between the energy level at the second excited state and an energy level lower than the first-mentioned energy level; light emitted at the time when the Tm ions experience a radiative transition from the second excited state, being oscillated, as laser, from the light emitting portion.

In the first laser element doped with rare earth ions, the other rare earth ions are excited upon absorption of laser which is incident from the incident portion and which is oscillated at a wavelength corresponding to the wavelength of light that the other rare earth ions absorb. When the Tm ions experience two excitations by absorption of light emitted from the other rare earth ions and/or energy transfer from the other rare earth ions, the Tm ions are brought to the first excited state from the ground state level, then brought to the second excited state from the first excited state, and then experience a radiative transition from the second excited state, thereby to emit infrared light. The incident portion and the light emitting portion forming the resonator cause this infrared light to resonate, after which the infrared light is oscillated as laser from the light emitting portion. This enables a commercially available high-output semiconductor laser to be used as the pumping source. It is therefore possible to oscillate high-output laser presenting a high conversion efficiency.

To achieve the first object above-mentioned, the present invention provides a second laser element doped with rare earth ions which is made of an optical material doped with Tm ions and other rare earth ions different from the Tm ions, and which has an incident portion and a light emitting portion which forms a resonator together with the incident portion; the other rare earth ions being adapted to be excited upon absorption of laser light which is oscillated at a wavelength corresponding to the wavelength of light that the other rare earth ions absorb and which is incident from the incident portion; the other rare earth ions being adapted to experience a radiative transition from an excited state, thereby to emit light at a wavelength of 1.0 μm to 1.2 μm; the Tm ions being adapted to be brought to (i) a first excited state from a ground state level when the Tm ions absorb light at a wavelength of 1.0 μm to 1.2 μm emitted from the other rare earth ions or when an energy is transferred to the Tm ions from the other rare earth ions as excited, (ii) a second excited state when the Tm ions at the first excited state absorb light at a wavelength of 1.0 μm to 1.2 μm emitted from the other rare earth ions or when an energy is transferred to the Tm ions at the first excited state from the other rare earth ions as excited, and (iii) a third excited state when the Tm ions at the second excited state absorb light at a wavelength of 1.0 μm to 1.2 μm emitted from the other rare earth ions or when an energy is transferred to the Tm ions at the second excited state, from the other rare earth ions as excited, so that the Tm ions exhibit population inversion between the energy level at the third excited state and an energy level lower than the first-mentioned energy level; light emitted at the time when the Tm ions experience a radiative transition from the third excited state, being oscillated, as laser, from the light emitting portion.

In the second laser element doped with rare earth ions, the Tm ions experience three excitations by absorption of light emitted from the other rare earth ions and/or energy transfer from the other rare earth ions, causing the Tm ions to be brought to the first excited state from the ground state level. Thereafter, the Tm ions are brought to the second excited state from the first excited state, and then to the third excited state from the second excited state. Then, the Tm ions experience a radiative transition from the third excited state, thereby to emit blue light. The incident portion and the light emitting portion forming the resonator, cause the blue light to resonate, after which the blue light is oscillated, as laser, from the light emitting portion. This enables a usual high-output semiconductor laser to be used as the pumping source. Further, it becomes possible to oscillate high-output laser of which energy is higher than that of the exciting light or of which wavelength is shorter than that of the exciting light.

To achieve the second object above-mentioned, the present invention provides a first optical amplifier element doped with rare earth ions which is made of an optical material doped with Tm ions and other rare earth ions different from the Tm ions, and which has an incident portion and a light emitting portion which forms a resonator together with the incident portion; the other rare earth ions being adapted to be excited upon absorption of laser which is oscillated at a wavelength corresponding to the wavelength of light that the other rare earth ions absorb and which is incident from the incident portion; the other rare earth ions being adapted to experience a radiative transition from an excited state, thereby to emit light at a wavelength from 1.0 μm to 1.2 μm; the Tm ions being adapted to be brought to (i) a first excited state from a ground state level when the Tm ions absorb light at a wavelength of 1.0 μm to 1.2 μm emitted from the other rare earth ions or when an energy is transferred to the Tm ions from the other rare earth ions as excited, and (ii) a second excited state when the Tm ions at the first excited state absorb light at a wavelength of 1.0 μm to 1.2 μm emitted from the other rare earth ions or when an energy is transferred to the Tm ions at the first excited state from the other rare earth ions as excited, so that the Tm ions exhibit population inversion between the energy level at the second excited state and an energy level lower than the first-mentioned energy level; light incident from the incident portion being amplified and the light thus amplified being emitted from the light emitting portion.

In the first optical amplifier element doped with rare earth ions, the other rare earth ions are excited upon absorption of laser which is incident from the incident portion and which is oscillated at a wavelength corresponding to the wavelength of light that the other rare earth ions absorb. When the Tm ions experience two excitations by absorption of light emitted from the other rare earth ions and/or energy transfer therefrom, the Tm ions are brought to the first excited state from the ground state level, and then brought to the second excited state from the first excited state. Thereafter, the Tm ions experience a radiative transition from the second excited state. Light incident from the incident portion, is amplified by the Tm ions which experience a radiative transition from the second excited state, and the light thus amplified is emitted from the light emitting portion.

To achieve the second object above-mentioned, the present invention provides a second optical amplifier element doped with rare earth ions which is made of an optical material doped with Tm ions and other rare earth ions different from the Tm ions, and which has an incident portion and a light emitting portion which forms a resonator together with the incident portion; the other rare earth ions being adapted to be excited upon absorption of laser which is oscillated at a wavelength corresponding to the wavelength of light that the other rare earth ions absorb, and which is incident from the incident portion; the other rare earth ions being adapted to experience a radiative transition from an excited state, thereby to emit light at a wavelength of 1.0 $\mu$m to 1.2 $\mu$m; the Tm ions being adapted to be brought to (i) a first excited state from a ground state level when the Tm ions absorb light at a wavelength of 1.0 $\mu$m to 1.2 $\mu$m emitted from the other rare earth ions or when an energy is transferred to the Tm ions from the other rare earth ions as excited, (ii) a second excited state when the Tm ions at the first excited state absorb light at a wavelength of 1.0 $\mu$m to 1.2 $\mu$m emitted from the other rare earth ions or when an energy is transferred to the Tm ions at the first excited state from the other rare earth ions as excited, and (iii) a third excited state when the Tm ions at the second excited state absorb light at a wavelength of 1.0 $\mu$m to 1.2 $\mu$m emitted from the other rare earth ions or when an energy is transferred to the Tm ions at the second excited state from the other rare earth ions as excited, so that the Tm ions exhibit population inversion between the energy level at the third excited state and an energy level lower than the first-mentioned energy level; light incident from the incident portion being amplified, and the light thus amplified being emitted from the light emitting portion.

In the second optical amplifier element doped with rare earth ions, the Tm ions experience three excitations by absorption of light emitted from the other rare earth ions and/or energy transfer therefrom. Thus, the Tm ions are brought to the first excited state from the ground state level, then brought to the second excited state from the first excited state, and then brought to the third excited state from the second excited state. Then, the Tm ions experience a radiative transition from the third excited state. Light incident from the incident portion, is amplified by the Tm ions which experience a radiative transition from the third excited state, and the light thus amplified is emitted from the light emitting portion.

According to each of the first and second optical amplifier elements doped with rare earth ions, there can be obtained a high amplification gain with the use of a usual semiconductor laser.

Each of the first and second laser elements doped with rare earth ions and each of the first and second optical amplifier elements doped with rare earth ions, can be readily applied not only to a usual 3- or 4-level solid-state laser or optical amplifier, but also to an upconversion-type solid-state laser or optical amplifier.

In each of the first and second laser elements doped with rare earth ions and each of the first and second optical amplifier elements doped with rare earth ions, the optical material may be an optical fiber having (i) a core presenting a high optical refractive index and (ii) a clad portion surrounding the core and presenting an optical refractive index lower than that of the core, the core being doped with the Tm ions and the other rare earth ions. The optical material may be made of a raw material of the fluoride type, the $SiO_2$ type or the halide type.

In each of the first and second laser elements doped with rare earth ions and each of the first and second optical amplifier elements doped with rare earth ions, the other rare earth ions are preferably Nd ions.

In each of the first and second laser elements doped with rare earth ions and each of the first and second optical amplifier elements doped with rare earth ions, the laser wavelength may be 680 nm +/−20 nm or 810 +/−20 nm.

To achieve the third object above-mentioned, the present invention provides a first rare-earth-ion-doped short-wavelength laser light source apparatus, which comprises: a pumping source for emitting exciting light at a first wavelength; a first optical material doped with first rare earth ions which experience an absorption transition by the exciting light, thereby to emit light at a second wavelength, the first optical material having (i) an incident portion upon which exciting light emitted from the pumping source is incident, and (ii) a light emitting portion for emitting both exciting light incident from the incident portion and emission light emitted from the first rare earth ions; and a second optical material doped with second rare earth ions which experience a ground-state absorption transition by the exciting light, which experience an excited-state absorption transition by the emission light, and which experience a radiative transition from an upper transition level of the excited-state absorption transition, thereby to emit light at a third wavelength, the second optical material having (i) an incident portion upon which exciting light and emission light emitted from the light emitting portion of the first optical material, are incident, and (ii) a light emitting portion which forms, together with the incident portion, a resonator where emission light emitted from the second rare earth ions resonates, and from which laser light oscillated by the resonator is supplied.

In the first rare-earth-ion-doped short-wavelength laser light source apparatus, the first rare earth ions are excited by exciting light emitted from the pumping source, thereby to emit light, and the second rare earth ions are upconversion-excited by exciting light emitted from the pumping source and emission light emitted from the first rare earth ions, so that the second rare earth ions experience a radiative transition from an upper transition level as upconversion-excited, thereby to emit light at a short wavelength. The light at a short wavelength emitted from the second rare earth ions, is oscillated as laser by the resonator comprising the incident portion and light emitting portion of the second optical material, and then supplied from the light emitting portion. The exciting light emitted from the pumping source causes the first rare earth ions to be excited in ground-state absorption. Dependent on the degree of ground-state absorption of the first rare earth ions, for example about a half of the light quantity of the exciting light, is not absorbed by the first rare earth ions but is incident upon the second optical material from the first optical material. More specifically, the first optical material emits lights at two different wavelengths including (i) that portion of the exciting light which has not been absorbed by the first rare earth ions, and (ii) emission light emitted from the first rare earth ions. Thus, two lights at two different wavelengths are incident upon the second optical material.

Accordingly, the second rare earth ions experience an excited-state absorption by exciting light and also experience an excited-state absorption by emission light emitted from the first rare earth ions. Thus, the second rare earth ions experience an upconversion-excitation by exciting light emitted from one pumping source, thereby to emit light at a short wavelength. It is therefore possible to achieve upconversion-excitation by one exciting light emitted from one economical pumping source having a simple structure.

To achieve the third object above-mentioned, the present invention provides a second rare-earth-ion-doped short-wavelength laser light source apparatus which comprises: a pumping source for emitting exciting light at a first wavelength; and an optical material doped with (i) first rare earth ions which experience an absorption transition by the exciting light, thereby to emit light at a second wavelength, and (ii) second rare earth ions which experience a ground-state absorption transition by the exciting light, which experience an excited-state absorption transition by emission light emitted from the first rare earth ions or receive an energy from the first rare earth ions that have experienced an absorption transition, causing the second rare earth ions to experience an excited-state absorption transition, and which experience a radiative transition from an upper transition level of the excited-state absorption transition, thereby to emit light at a third wavelength, the optical material having (i) an incident portion upon which exciting light emitted from the pumping source is incident, and (ii) a light emitting portion which forms, together with the incident portion, a resonator where emission light emitted from the second rare earth ions resonates, and from which laser light oscillated by the resonator is supplied.

In the second rare-earth-ion-doped short-wavelength laser light source apparatus, the first rare earth ions are excited by exciting light emitted from the pumping source, thereby to emit light. The second rare earth ions experience an excited state absorption by both exciting light emitted from the pumping source and emission light emitted from the first rare earth ions, or experience an excited state absorption by absorption of exciting light emitted from the pumping source and energy transfer from the first rare earth ions which have reached an upper transition level of the ground-state absorption transition. Light at a short wavelength emitted from the second rare earth ions, is oscillated as laser by the resonator formed by the incident portion and light emitting portion of the optical material, and then supplied from the light emitting portion. Exciting light emitted from the pumping source causes the first rare earth ions to experience an excitation of ground-state absorption, and also causes the second rare earth ions to experience an excitation of ground-state absorption. The second rare earth ions experience an excited-state absorption transition by emission light from the first rare earth ions, or receive an energy from the first rare earth ions which have reached an upper transition level by the ground-state absorption, causing the second rare earth ions to experience an excited-state absorption transition. It is dependent on the type of the second rare earth ions whether the second rare earth ions experience an excited-state absorption transition by emission light from the first rare earth ions or receive an energy from the first rare earth ions which have reached an upper transition level.

The second rare earth ions experience an excited state absorption by exciting light emitted from one pumping source, thereby to emit light at a short wavelength. It is therefore possible to achieve an upconversion-excitation by one exciting light emitted from one economical pumping source having a simple structure. In the second rare-earth-ion-doped short-wavelength laser light source apparatus, one optical material is doped with the first and second rare earth ions. This slightly lowers the efficiency because of a back-transfer phenomenon from the second rare earth ions to the first rare earth ions. However, this second laser light source apparatus is advantageous in that the number of optical materials is reduced to one.

DETAILED DESCRIPTION OF THE INVENTION

The following description will discuss a laser element doped with rare earth ions according to a first embodiment of the present invention with reference to attached drawings.

Figure 1:
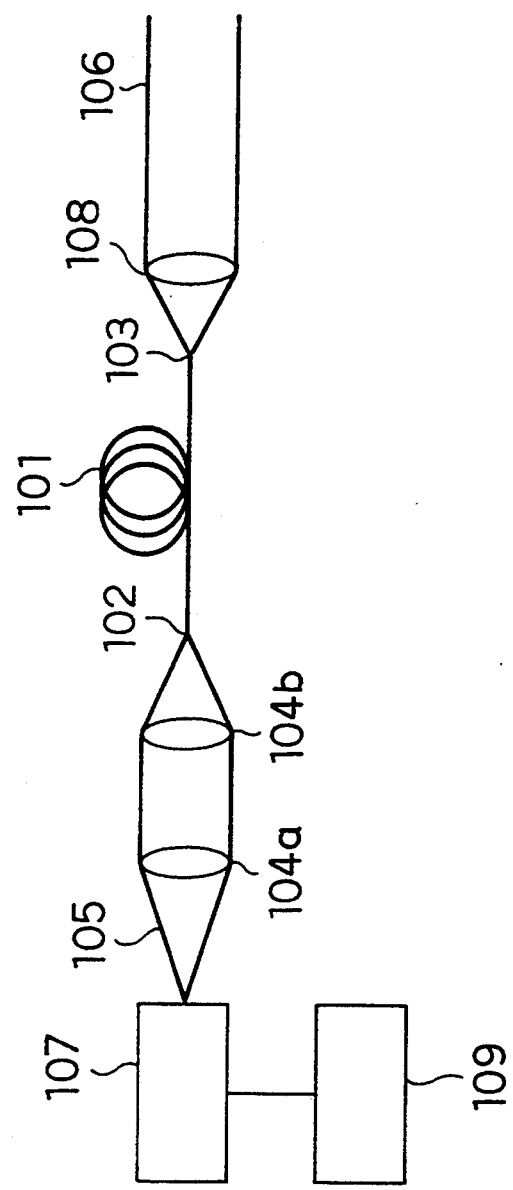
FIG. 1 is a view illustrating the arrangement of a solid-state laser using a rare-earth-ion-doped laser element according to a first or second embodiment of the present invention.

FIG. 1 shows the arrangement of a solid-state laser using the laser element doped with rare earth ions according to the first embodiment. The solid-state laser has an optical fiber 101 serving as an optical material, an incident portion 102 of the optical fiber 101, a light emitting portion 103 of the optical fiber 101, incident lens 104a, 104b, a pumping source 107 comprising a semiconductor laser for emitting exciting light in a 800-nm band, a light emitting lens system 108 and a drive power source 109 for driving the pumping source 107. When driven by the drive power source 109, the pumping source 107 emits exciting light 105 in a 800-nm band. The exciting light 105 is focussed by the incident lens systems 104a, 104b, and then incident upon the optical fiber 101 through the incident portion 102. The exciting light 105 acquires gain in the optical fiber 101 and is then oscillated as laser or emission light 106 from the light emitting portion 103. Then, the emission light 106 is converted into a collimated beam by the light emitting lens system 108.

In the first embodiment, the optical material forming the optical fiber 101 is a fluoride material, e.g. ZBLAN, doped with 1,000 p.p.m. of $Tm^{3+}$ ions and 1,000 p.p.m. of $Nd^{3+}$ ions serving as other rare earth ions. In the optical fiber 101, the core diameter is 3 $\mu m$, the clad diameter is 125 $\mu m$ and the cutoff wavelength is 0.6 $\mu m$.

Figure 2:
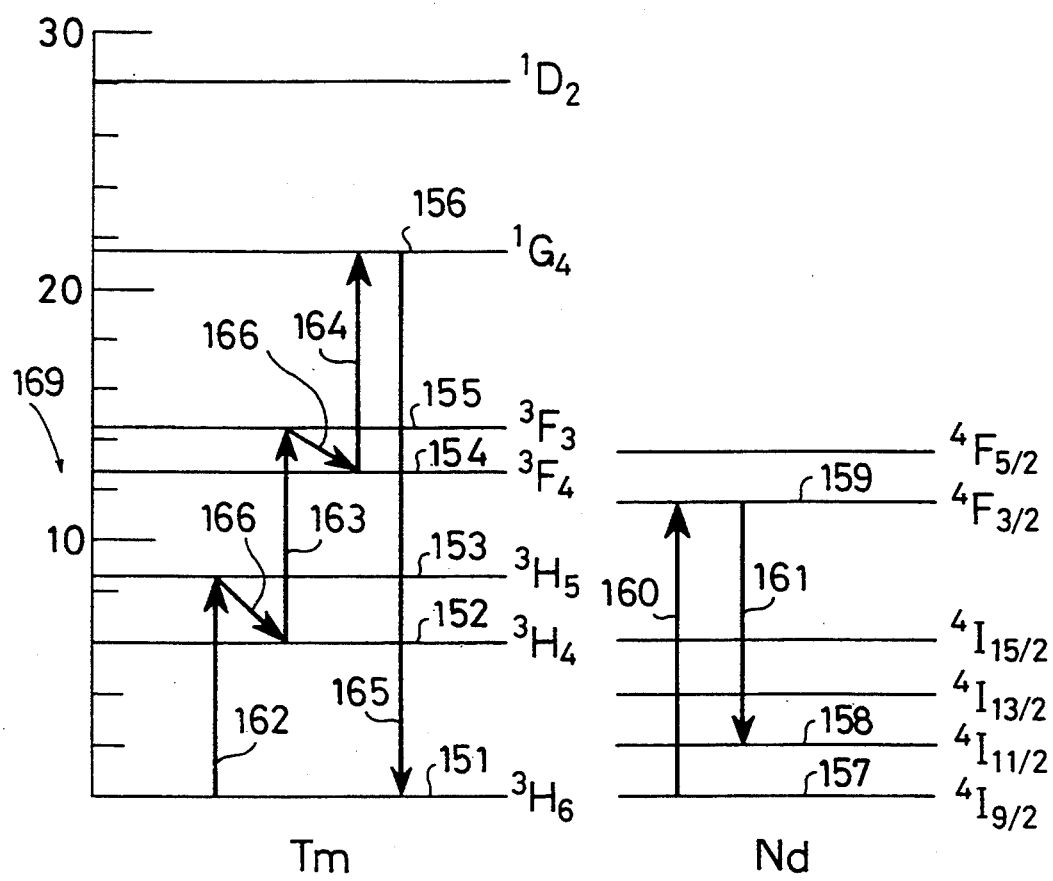
FIG. 2 shows the transitions of energy level of rare earth ions in the first embodiment of the present invention.

The following description will discuss in detail the operation of exciting light in the optical material above-mentioned, with reference to FIG. 2 illustrating energy transitions. Shown in FIG. 2 are energy levels 151 to 159 and transitions 160 to 166 among the energy levels 151 to 159. The ordinate 169 shows the energy in unit $cm^{-1}$ (Kayser).

The exciting light 105 emitted from the pumping source 107 shown in FIG. 1, is absorbed by the Nd ions with which the optical material was doped. The Nd ions undergo the following change in energy level. That is, the Nd ions experience the absorption transition 160 from the ground state level 157 to the high energy level 159. Then, the Nd ions experience the radiative transition 161 from the high energy level 159 to the intermediate level 158.

Inside of the optical material, light at a wavelength from 1.0 $\mu m$ to 1.2 $\mu m$ emitted by the radiative transition 161, is absorbed by the Tm ions, or there is achieved energy transfer between the Nd ions and the Tm ions. This causes the Tm ions to experience the first excition transition 162. More specifically, the Tm ions undergo the following change in energy level. The first excitation transition 162 changes the Tm ions in energy level from the ground state level 151 to the first high energy level 153, and the nonradiative transition 166 changes the Tm ions in energy level to the first intermediate level 152. It is noted that there also exist Tm ions which directly absorb the exciting light 105 emitted from the pumping source 107 and consequently experience a transition from the ground state level 151 to the first intermediate level 152.

Figure 5:
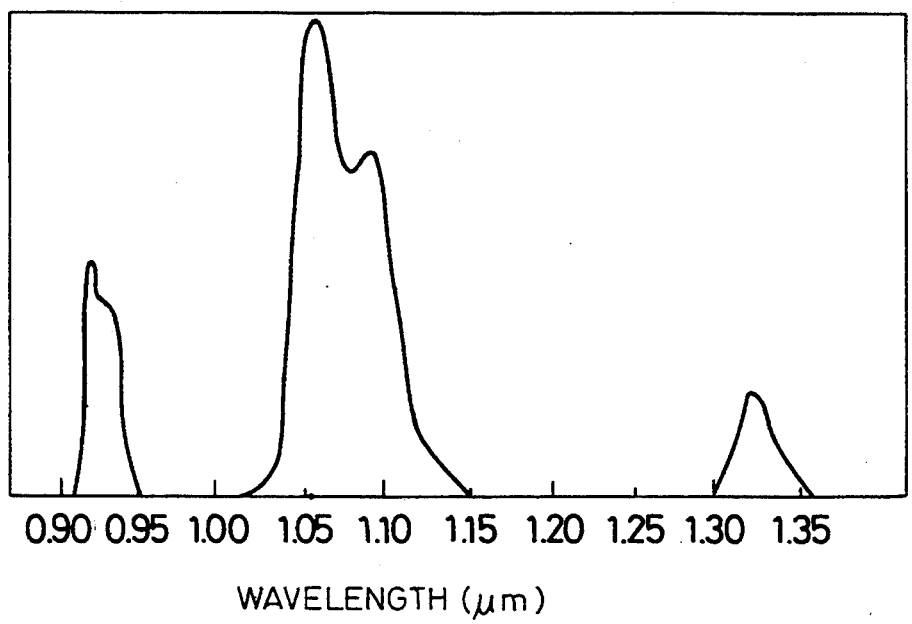
FIG. 5 is a view illustrating light emission characteristics of Nd ions.
Figure 6:
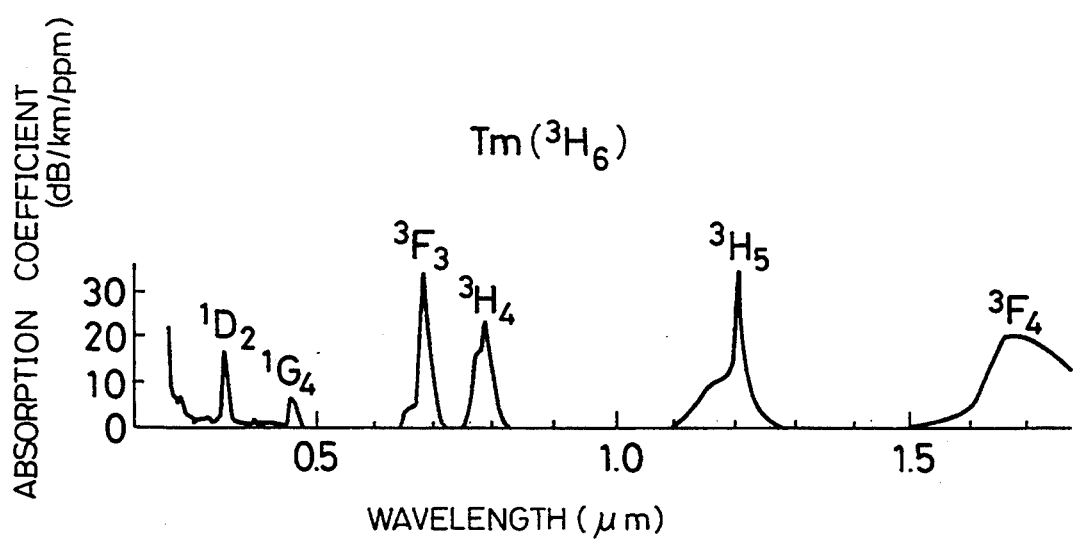
FIG. 6 is a view illustrating light absorption characteristics of Tm ions.

FIG. 5 shows the light emitting characteristics of Nd ions. In FIG. 5, the abscissa shows the wavelength in $\mu m$, while the ordinate shows the optical output in optional unit. FIG. 6 shows the absorption characteristics of Tm ions. In FIG. 6, the abscissa shows the wavelength in $\mu m$, while the ordinate shows the absorption coefficient in dB/km/ppm. As apparent from FIGS. 5 and 6, the wavelength area of light emitted from the Nd ions is in the range from 1.0 to 1.2 $\mu m$, and the wavelength area of light absorbed by the Tm ions at the ground state level, is also in the range from 1.0 to 1.2 $\mu m$. Since both wavelength areas are identical with each other, there are achieved, with high probability, (i) absorption by the Tm ions of light emitted from the Nd ions by the radiative transition 161 and (ii) energy transfer between the Nd ions and the Tm ions.

Thereafter, inside of the optical material, light at a wavelength from 1.0 $\mu m$ to 1.2 $\mu m$ emitted by the radiative transition 161, is absorbed by the Tm ions, or there is achieved energy transfer between the Nd ions and the Tm ions. This causes the Tm ions to experience the second excitation transition 163. More specifically, the Tm ions undergo the following change in energy level. The second excitation transition 163 changes the Tm ions in energy level from the first intermediate level 152 to the second high energy level 155, and the nonradiative transition 166 then changes the Tm ions in energy level to the second intermediate level 154.

Thereafter, inside of the optical material, again, light at a wavelength from 1.0 $\mu m$ to 1.2 $\mu m$ emitted by the radiative transition 161, is absorbed by the Tm ions, or there is achieved energy transfer between the Nd ions and the Tm ions. This causes the Tm ions to experience the third excition transition 164. More specifically, the third excitation transition 164 changes the Tm ions in energy level from the second intermediate level 154 to the third high energy level 156.

Thereafter, the radiative transition 165 changes the Tm ions in energy level from the third high energy level 156 to the ground state level 151. This radiative transition 165 emits blue light at a wavelength of 480 nm.

The Tm ions exhibit population inversion between the third high energy level 156 and the ground state level 151. The light at 480 nm emitted from the Tm ions by the radiative transition 165, is caused to resonate by reflection-type mirrors respectively disposed at the end surfaces of the incident portion 102 and the light emitting portion 103 of the optical fiber 101, and therefore acquires gain. Thereafter, the light is oscillated, as blue laser, from the light emitting portion 103. The laser oscillated from the light emitting portion 103 of the optical fiber 101, is converted into a collimated beam by the light emitting lens system 108. In the first embodiment, the reflectivity of the reflection-type mirrors with respect to light at a wavelength of 480 nm, is set to 99% at the incident portion 102 and 95% at the light emitting portion 103.

As discussed in the foregoing, the rare-earth-ion-doped laser element experiences three upconversion processes by the energy of the exciting light, and oscillates light having an energy higher than that of the exciting light, i.e., laser at a wavelength shorter than that of the exciting light.

In a conventional blue laser element for achieving upconversion by exciting light, exciting light in the vicinity of 1.12 μm must be externally incident upon the laser element. However, lasers which oscillate at a wavelength in the vicinity of 1.12 μm, are difficult to obtained. It is therefore difficult to obtain exciting light in the vicinity of 1.12 μm. However, the first embodiment can use, as the pumping source, a commercially available semiconductor laser element which oscillates high-output laser at a wavelength in a 800-nm band, thus providing an economical and small-size blue solid-state laser.

The feature of the laser element according to the first embodiment, resides in the fact that output light of 50 mW can be obtained with respect to a pumping source presenting a light output of 100 mW; that is, the conversion efficiency is as high as 50%.

The following description will discuss a laser element doped with rare earth ions according to a second embodiment of the present invention, with reference to attached drawings.

The arrangement of a solid-state laser using a rare-earth-ion-doped laser element according to the second embodiment, is similar to that in the first embodiment. Therefore, the illustration thereof is here omitted.

Figure 3:
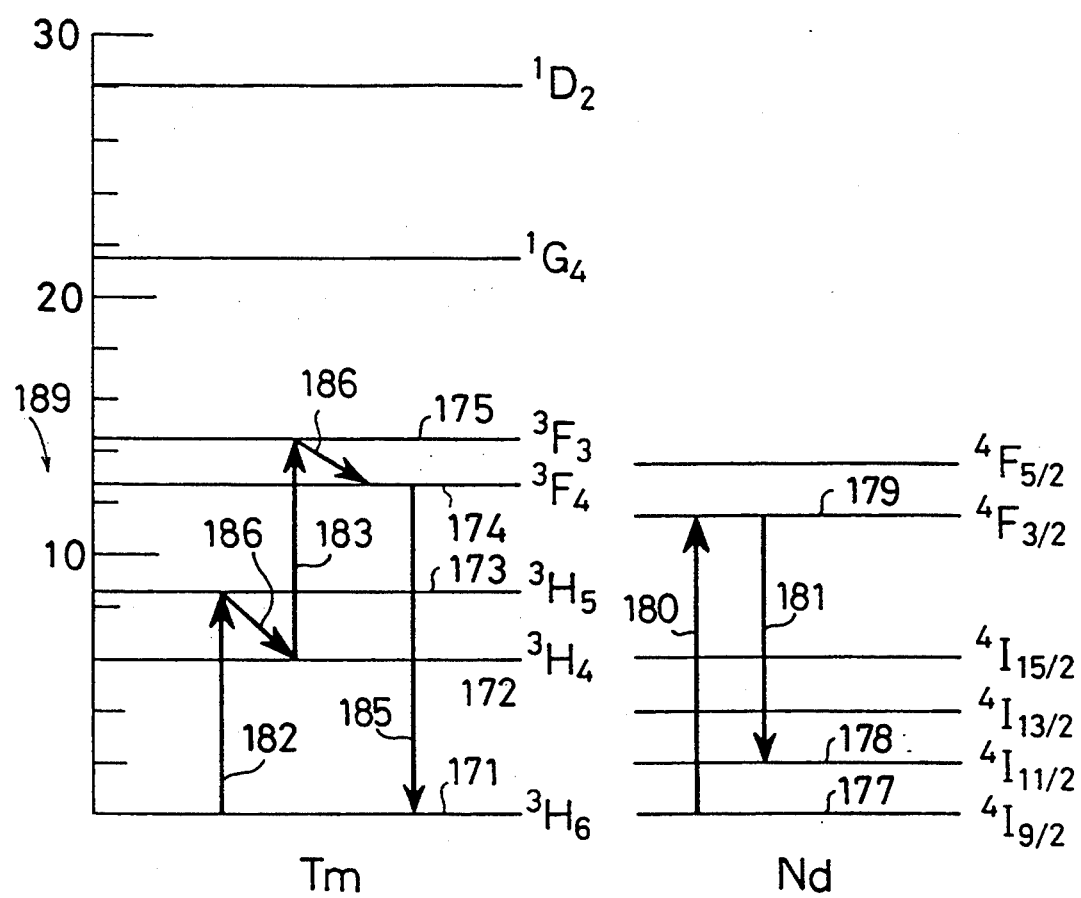
FIG. 3 shows the transitions of energy level of rare earth ions in the second embodiment of the present invention.

FIG. 3 shows the energy levels of Nd ions and Tm ions with which an optical material forming an optical fiber 101 in the second embodiment, was doped. Shown in FIG. 3 are energy levels 171 to 179 and transitions 180 to 186 among the energy levels 171 to 179. The ordinate 189 shows the energy in unit cm$^{-1}$ (Kayser).

The exciting light 105 emitted from the pumping source 107 shown in FIG. 1, is absorbed by the Nd ions with which the optical material was doped, and the Nd ions experience the absorption transition 180 from the ground state level 177 to the high energy level 179. Thereafter, the Nd ions experience the radiative transition 181 from the high energy level 179 to the intermediate level 178.

Inside of the optical material, light at a wavelength from 1.0 μm to 1.2 μm emitted by the radiative transition 181, is absorbed by the Tm ions, or there is achieved energy transfer between the Nd ions and the Tm ions. This causes the Tm ions to experience the first excition transition 182. More specifically, the first excitation transition 182 changes the Tm ions in energy level from the ground state level 171 to the first high energy level 173, and the nonradiative transition 186 changes the Tm ions in energy level to the first intermediate level 172.

Thereafter, inside of the optical material, light at a wavelength from 1.0 μm to 1.2 μm emitted by the radiative transition 181, is absorbed by the Tm ions, or there is achieved energy transfer between the Nd ions and the Tm ions. This causes the Tm ions to experience the second excitation transition 183. More specifically, the second excitation transition 183 changes the Tm ions in energy level from the first intermediate level 172 to the second high energy level 175, and the nonradiative transition 186 then changes the Tm ions in energy level to the second intermediate level 174.

Thereafter, the radiative transition 185 changes the Tm ions in energy level from the second intermediate level 174 to the ground state level 171. This radiative transition 185 emits infrared light at a wavelength of 1.48 μm.

The Tm ions exhibit population inversion between the second intermediate level 174 and the ground state level 171. The light at a wavelength of 1.48 μm emitted from the Tm ions by the radiative transition 185, is caused to resonate by reflection-type mirrors respectively disposed at the end surfaces of the incident portion 102 and the light emitting portion 103 of the optical fiber 101, and therefore acquires gain. Thereafter, the light is oscillated, as infrared laser, from the light emitting portion 103. The laser oscillated from the light emitting portion 103 of the optical fiber 101 is converted into parallel lights by the light emitting lens system 108.

In the second embodiment, the reflectivity of the reflection-type mirrors with respect to light at a wavelength of 1.48 μm, is set to 99% at the incident portion 102 and 95% at the light emitting portion 103.

The second embodiment can use, as the pumping source, a commercially available semiconductor laser element which oscillates high-output laser at a wavelength in a 800-nm band. Thus, there can be achieved an economical and small-size infrared-light laser element. The feature of the laser element according to the second embodiment, resides in the fact that output light of 500 mW can be obtained with respect to a pumping source presenting a light output of 1 W. According to a conventional solid-state laser element for oscillating laser at a wavelength of 1.48 μm, output light of 120 mW can be easily obtained. However, according to the second embodiment, an output as high as 500 mW can be obtained.

The following description will discuss an optical amplifier element doped with rare earth ions according to a third embodiment of the present invention, with reference to attached drawings.

Figure 4:
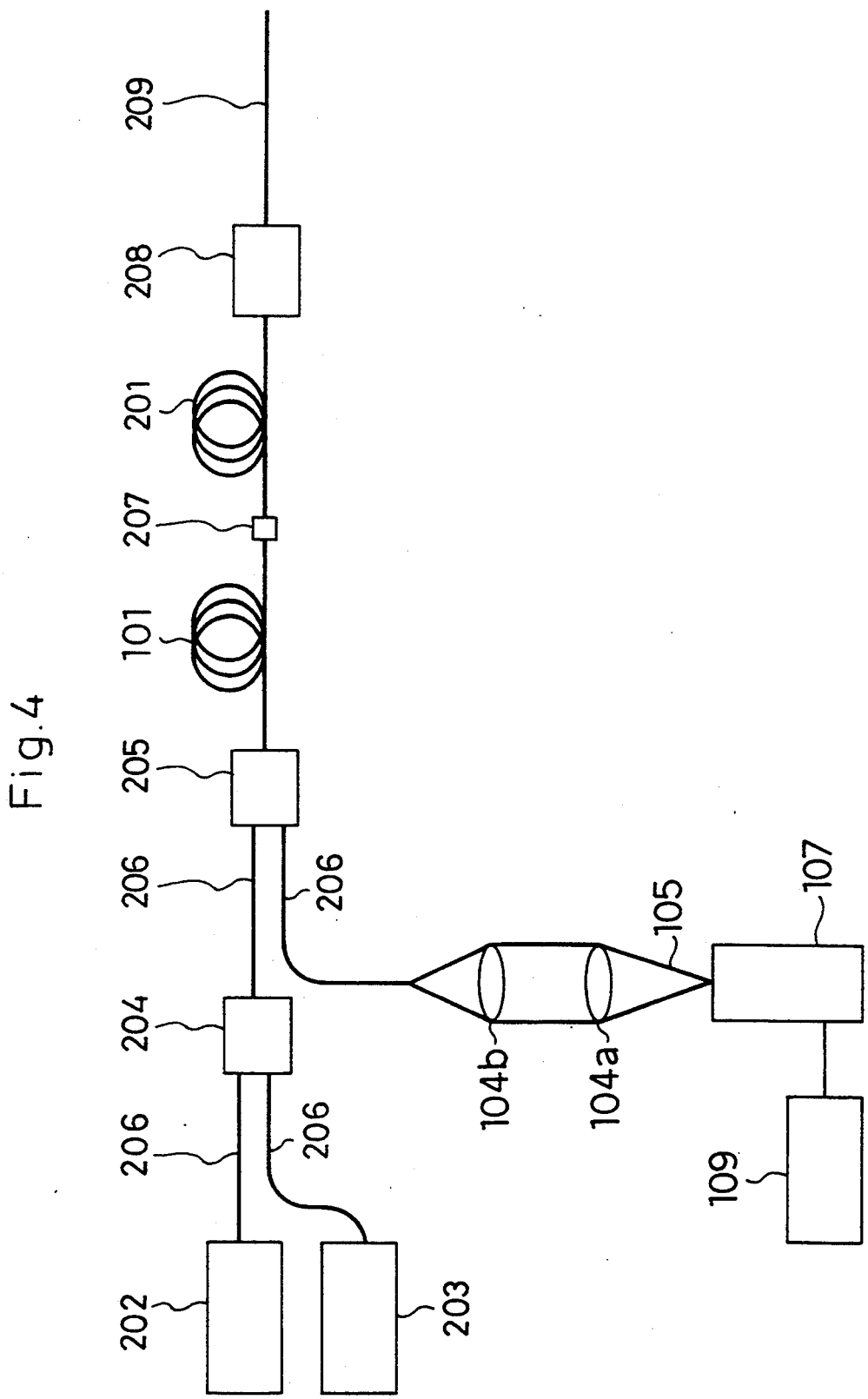
FIG. 4 is a view illustrating the arrangement of an optical amplifier using a rare-earth-ion-doped optical amplifier element according to a third embodiment of the present invention.

FIG. 4 shows the arrangement of an optical amplifier using the rare-earth-ion-doped optical amplifier element according to the third embodiment. The optical amplifier has a first optical fiber 101 serving as an optical material, incident lens systems 104a, 104b, a pumping source 107 comprising a semiconductor laser for emitting exciting light in a 800-nm band, a drive power source 109 for driving the pumping source 107, a second optical fiber 201 made of an optical material doped with Er ions, a signal light source 202 for emitting signal light at 1.55 μm, a semiconductor laser module 203 at 1.48 μm for exciting the second optical fiber 201, a first coupler 204 for coupling signal light emitted from the signal light source 202 with light emitted from the semiconductor laser module 203, a second coupler 205 for coupling light emitted from the first coupler 204 with exciting light emitted from the pumping source 107, four connecting optical fibers 206, a connection portion 207 for connecting the first optical fiber 101 to the second optical fiber 201, an optical isolator 208 and a light emitting portion 209.

Signal light at 1.55 μm emitted from the signal light source 202 and light at 1.48 μm emitted from the semiconductor laser module 203, are coupled with each other by the first coupler 204, and then incident upon the second coupler 205. Exciting light 105 in a 800-nm band emitted from the pumping source 107, is focussed by the incident lens systems 104a, 104b, and then incident upon the second coupler 205 through a connection optical fiber 206. The signal light at 1.55 μm generated by the second coupler 205, the light at 1.48 μm and the exciting light in a 800-nm band are incident upon the first optical fiber 101. Likewise in the second embodiment, the light at 1.48 μm is amplified by the exciting light in a 800-nm band in the first optical fiber 101. The signal light at 1.55 μm, the amplified light at 1.48 μm and the exciting light in a 800-nm band are incident upon the second optical fiber 201 through the connection portion 207. The signal light at 1.55 μm is amplified by the pump light at 1.48 μm in the second optical fiber 201, and the signal light thus amplified is emitted from the light emitting portion 209. The isolator 208 prevents the oscillation of laser at 1.55 μm in the second optical fiber 201.

With the use of the rare-earth-ion-doped optical amplifier having the arrangement above-mentioned, there were supplied −10 dBm of signal light at 1.55 μm, 100 mW of light at 1.48 μm and 300 mW of exciting light in a 800-nm band. At the connection portion 207, there were detected −10 dBm of the signal light at 1.55 μm, 1 W of the light at 1.48 μm and 10 mW of the light in a 800-nm band. At the light emitting portion 209, there was detected 40 dBm of the signal light at 1.55 μm. From the foregoing, it was made sure that gain of 50 dB was obtained for the signal light at 1.55 μm. More specifically, according to a conventional optical amplifier, there can merely be obtained 40 dB of amplification gain of the signal light at 1.55 μm even with the use of a semiconductor laser at 1.48 μm of which maximum output is equal to 120 mW. On the other hand, there can be obtained 50 dB of gain with the use of an optical amplifier using the optical amplifier element according to the third embodiment.

In each of the first to third embodiments, there is used a fluoride-type optical material. Instead of such optical material, there may also be used an optical material made of a raw material of the $SiO_2$ type or the halide type such as $InF_3$ or the like.

In each of the first to third embodiments, the Nd ions are excited by light in a 800-nm band. However, the Nd ions may also be excited by light at other wavelength as far as the Nd ions can absorb such light.

In each of the first to third embodiments, there is used, as exciting light for exciting the Tm ions, light at 1.12 μm emitted from the Nd ions. Instead of such Nd ions, there may also be used other types of rare earth ions for emitting light at a wavelength in the vicinity of 1.0 μm, i.e., $Yb^{3+}$ ions, $Pr^{3+}$ ions, $Sm^{3+}$ ions, $Ho^{3+}$ ions and the like for emitting light which the Tm ions can absorb.

The following description will discuss the arrangement of a rare-earth-ion-doped short-wavelength laser light source apparatus according to a fourth embodiment of the present invention.

Figure 7:
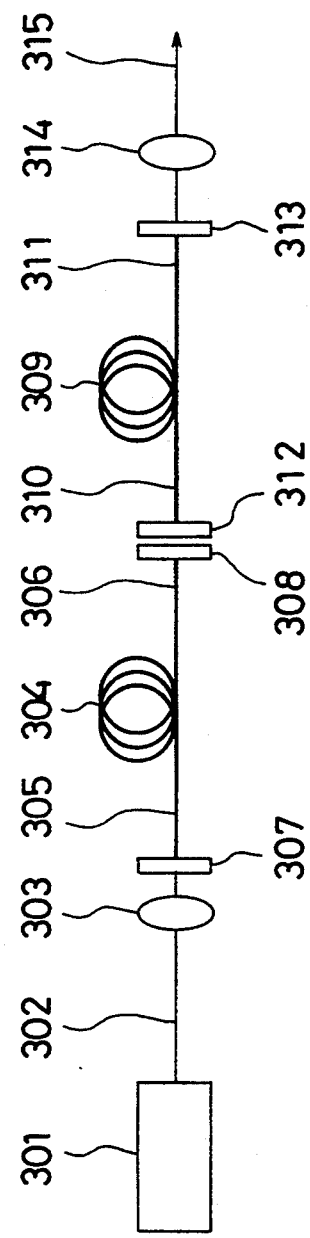
FIG. 7 is a view illustrating the general arrangement of a rare-earth-ion-doped short-wavelength laser light source apparatus according to a fourth embodiment of the present invention.

FIG. 7 is a view illustrating the general arrangement of a rare-earth-ion-doped short-wavelength laser light source apparatus according to a fourth embodiment of the present invention. Shown in FIG. 7 are a pumping source 301, exciting light 302 emitted from the pumping source 301, an incident lens 303, a first optical fiber 304 made of a fluoride doped with rare earth ions, an incident portion 305 of the first optical fiber 304, a light emitting portion 306 of the first optical fiber 304, an incident-end-surface mirror 307 of the first optical fiber 304, an emitting-end-surface mirror 308 of the first optical fiber 304, a second optical fiber 309 made of a fluoride doped with rare earth ions, an incident portion 310 of the second optical fiber 309, a light emitting portion 311 of the second optical fiber 309, an incident-end-surface mirror 312 of the second optical fiber 309, an emitting-end-surface mirror 313 of the second optical fiber 309, a light emitting lens 314 and output light 315 emitted from the light emitting lens 314.

In the fourth embodiment, the pumping source 301 is a semiconductor laser device for oscillating laser at a wavelength in a 800-nm band. The exciting light 302 is laser light at a wavelength in a 800-nm band. The first optical fiber 304 is made of a fluoride doped with Nd ions of which concentration is in the range from 100 to 10,000 p.p.m. (1 p.p.m refers to a part per million by weight). In the first optical fiber 304, the core diameter is 3 μm, the clad diameter is 125 μm and the length is 2 m. The incident-end-surface mirror 307 is made of a film from which light at a wavelength in a 800-nm band is not reflected and from which light at a wavelength of 1.1 μm is reflected at reflectivity of 60 to 90%. The emitting-end-surface mirror 308 is made of a film from which light at a wavelength in a 800-nm band is not reflected and from which light at a wavelength of 1.1 μm is also not reflected. The second optical fiber 309 is made of a fluoride doped with Tm ions of which concentration is in the range from 100 to 10,000 p.p.m. In the second optical fiber 309, the core diameter is 3 μm, the clad diameter is 125 μm and the length is 2 m. The incident-end-surface mirror 312 is made of a film from which light at a wavelength in a 800-nm band is not reflected, from which light at a wavelength of 1.1 μm is also not reflected and from which light at a wavelength of 480 nm is reflected at high reflectivity. The emitting-end-surface mirror 313 is made of a film from which light at a wavelength of 480 nm is reflected at reflectivity of 90%.

The following description will discuss the operation of the rare-earth-ion-doped short-wavelength laser light source apparatus according to the fourth embodiment. The exciting light 302 emitted from the pumping source 301, is focussed by the incident lens 303, and is then incident upon the first optical fiber 304 through the incident portion 305 of the first optical fiber 304. A portion of the exciting light 302 is absorbed by the Nd ions inside of the first optical fiber 304. The Nd ions are excited by the exciting light 302 from the ground state level $^4I_{9/2}$ to a level $^4F_{3/2}$. When the Nd ions experience a radiative transition from the level $^4F_{3/2}$ to a level $^4I_{11/2}$, light at a wavelength of 1.06 μm to 1.12 μm is emitted. This emission light is propagated in the first optical fiber 304 and is caused to resonate between the incident-end-surface mirror 307 and the emitting-end-surface mirror 308. This causes the light to be converted into laser light, which is then taken out from the light emitting portion 306 of the first optical fiber 304. The remaining portion of the exciting light 302 is simultaneously taken out from the light emitting portion 306 of the first optical fiber 304. Two lights at two wavelengths emitted from the light emitting portion 306 of the first optical fiber 304, are incident upon the second optical fiber 309. Inside of the second optical fiber 309, both lights are absorbed by the Tm ions. When the Tm ions experience a ground-state absorption of the exciting light 302 at a wavelength in a 800-nm band, the Tm ions are excited from a ground state level $^3H_6$ to a level $^3F_4$. When the Tm ions experience an excited-state absorption of the emission light at a wavelength of 1.1 μm, the Tm ions are excited from the level $^3F_4$ to a level $^1G_4$. When the Tm ions experience a radiative transition from the level $^1G_4$ to the ground state level $^3H_6$, there is emitted light at a wavelength of 480 nm. This emission light resonates between the incident-end-surface mirror 312 and the emitting-end-surface mirror 313, causing the light to be converted into laser light. This laser light is emitted, as the output light 315, from the light emitting portion 311 of the second optical fiber 309, and is converted, by the incident lens 314, into parallel lights, which are then taken out.

Figure 8:
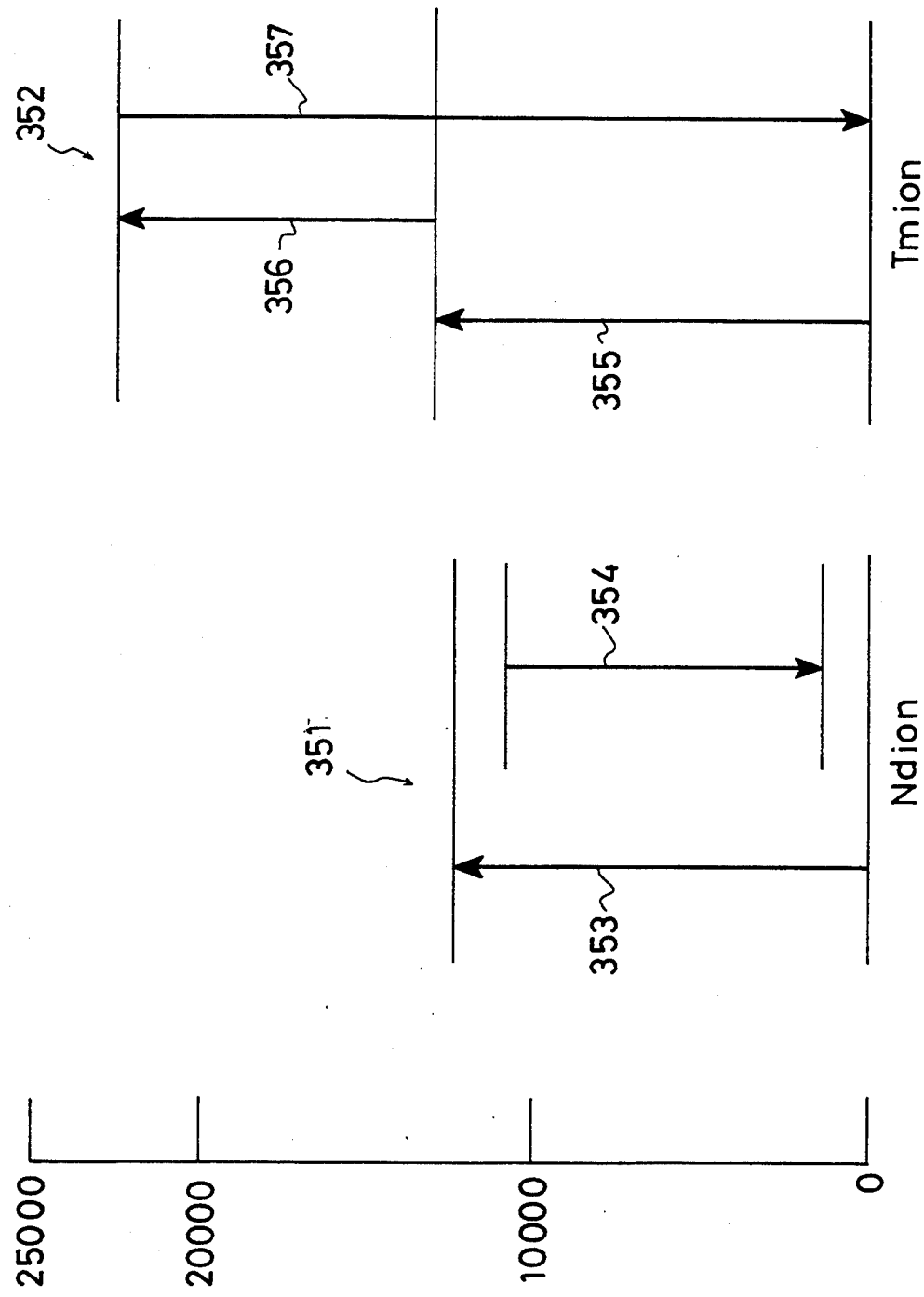
FIG. 8 shows the energy levels of rare earth ions in the rare-earth-ion-doped short-wavelength laser light source apparatus according to the fourth embodiment of the present invention.

FIG. 8 shows a view of the energy levels of the Nd ions and the Tm ions. In FIG. 8, the ordinate shows the level energy of rare earth ions in unit cm$^{-1}$ (Kayser), and there are shown Nd-ion levels 351 and Tm-ion levels 352. Also shown in FIG. 8 are a ground-state absorption transition 353 which the Nd ions experience upon absorption of the exciting light in a 800-nm band, a 1.1 μm-radiative transition 354 which the Nd ions experience, a ground-state absorption transition 355 which the Tm ions experience upon absorption of the exciting light in a 800-nm band, an excited-state absorption transition 356 which the Tm ions experience by the exciting light at 1.1 μm, and a 480 nm-radiative transition 357 of the Tm ions from a level $^1G_4$ to a ground state level $^3H_6$. As shown by the level transitions 353, 355 in FIG. 8, the light at a wavelength in a 800-nm band is suitable for both ground-state absorptions of the Nd ions and the Tm ions. Also apparent from FIG. 8, the 1.1 μm-radiative transition 354 of the Nd ions and the ground-state absorption transition 356 of the Tm ions, are very similar to each other in view of energy.

Figure 9:
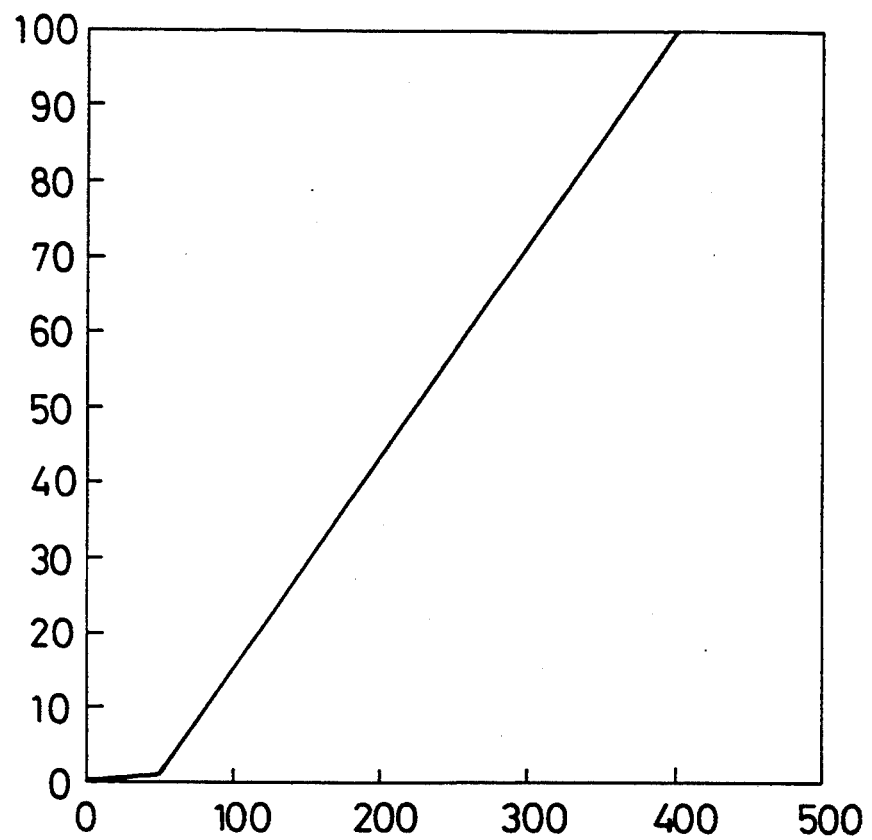
FIG. 9 shows the relationship in power between exciting light and output light in the the rare-earth-ion-doped short-wavelength laser light source apparatus according to the fourth embodiment of the present invention.

FIG. 9 shows the relationship in power between the exciting light 302 and the blue output light 315 at a wavelength of 480 nm in the rare-earth-ion-doped short-wavelength laser light source apparatus of the fourth embodiment. In FIG. 9, the abscissa shows the power of the exciting light 302, while the ordinate shows the power of the output light 315. As shown in FIG. 9, the blue output light 315 supplied from the second optical fiber 309 at the time when the exciting light 302 of 50 mW was incident upon the first optical fiber 304, reached a threshold value of laser oscillation. Further, the output light efficiency or ratio in power of the output light 315 to the exciting light 302, reached 35%, and there was obtained the output light 315 of which maximum power was equal to 100 mW. This shows an improvement in output by 60% or more as compared with 60 mW reported by Grubb. In view of the facts that the power of the exciting light 302 at the time when the power of the output light 315 is 100 mW, is 400 mW and that the input coupling efficiency to the first optical fiber 304 is 30%, it is considered that light of 1.2 W is supplied from the pumping source 301. This value can be readily achieved by an AlGaAs semiconductor laser. Accordingly, it is not required to use a large-size solid-state laser as the pumping source 301, thus enabling the short-wavelength laser light source apparatus to be made in a very compact design.

In the fourth embodiment, to achieve upconversion excitation of the Tm ions, there is used the first optical fiber 304 doped with Nd ions. Instead of the first optical fiber 304 doped with Nd ions, a first optical fiber doped with Yb ions may also be used because such an optical fiber is excited by light at a wavelength in a 800-nm band and emits light at a wavelength in a 1.1-μm band.

The following description will discuss a rare-earth-ion-doped short-wavelength laser light source apparatus according to a fifth embodiment of the present invention.

Figure 10:
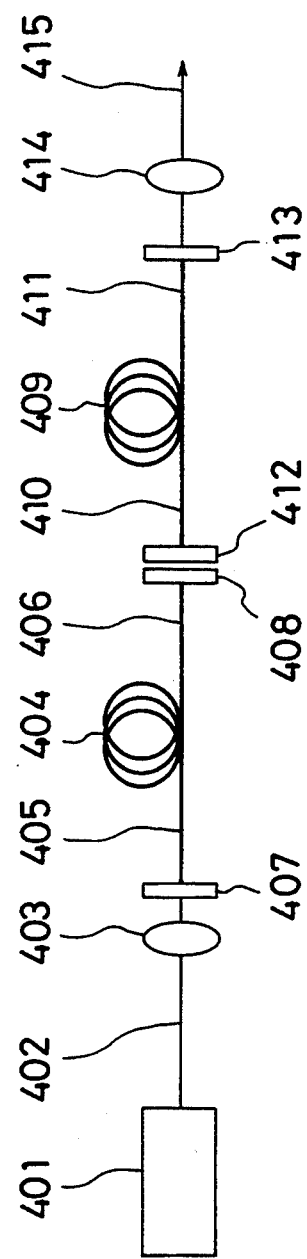
FIG. 10 is a view illustrating the general arrangement of the rare-earth-ion-doped short-wavelength laser light source apparatus according to a fifth embodiment of the present invention.

FIG. 10 is a view illustrating the general arrangement of a rare-earth-ion-doped short-wavelength laser light source apparatus according to the fifth embodiment.

Shown in FIG. 10 are a pumping source 401, exciting light 402 emitted from the pumping source 401, an incident lens 403, a first optical fiber 404 made of a fluoride doped with rare earth ions, an incident portion 405 of the first optical fiber 404, a light emitting portion 406 of the first optical fiber 404, an incident-end-surface mirror 407 of the first optical fiber 404, an emitting-end-surface mirror 408 of the first optical fiber 404, a second optical fiber 409 made of a fluoride doped with rare earth ions, an incident portion 410 of the second optical fiber 409, a light emitting portion 411 of the second optical fiber 409, an incident-end-surface mirror 412 of the second optical fiber 409, an emitting-end-surface mirror 413 of the second optical fiber 409, a light emitting lens 414 and output light 415 emitted from the light emitting lens 414.

In the fifth embodiment, the pumping source 401 is a semiconductor laser device for oscillating laser at a wavelength in a 800-nm band. The exciting light 402 is laser light at a wavelength in a 800-nm band. The first optical fiber 404 is made of a fluoride doped with Tm ions of which concentration is in the range from 100 to 10,000 p.p.m. (1 p.p.m refers to a part per million by weight). In the first optical fiber 404, the core diameter is 3 μm, the clad diameter is 125 μm and the length is 2 m. The incident-end-surface mirror 407 is made of a film from which light at a wavelength in a 800-nm band is not reflected and from which light at a wavelength of 1.47 μm is reflected at reflectivity of 60 to 90%. The emitting-end-surface mirror 408 is made of a film from which light at a wavelength in a 800-nm band is not reflected and from which light at a wavelength of 1.47 μm is also not reflected. The second optical fiber 409 is made of a fluoride doped with Er ions of which concentration is in the range from 100 to 10,000 p.p.m. In the second optical fiber 409, the core diameter is 3 μm, the clad diameter is 125 μm and the length is 2 m. The incident-end-surface mirror 412 is made of a film from which light at a wavelength in a 800-nm band is not reflected, from which light at a wavelength of 1.47 μm is also not reflected and from which light at a wavelength of 550 nm is reflected at high reflectivity. The emitting-end-surface mirror 413 is made of a film from which light at a wavelength of 550 nm is reflected at reflectivity of 90%.

The following description will discuss the operation of the rare-earth-ion-doped short-wavelength laser light source apparatus according to the fifth embodiment.

The exciting light 402 emitted from the pumping source 401 is focussed by the incident lens 403, and is then incident upon the first optical fiber 404 through the incident portion 405 of the first optical fiber 404. A portion of the exciting light 402 is absorbed by the Tm ions inside of the first optical fiber 404. The Tm ions are excited by the exciting light 402 from the ground state level $^3H_6$ to a level $^3H_4$. When the Tm ions experience a radiative transition from the level $^3H_4$ to a level $^3F_4$, light at a wavelength of 1.45 μm to 1.48 μm is emitted. This emission light is propagated in the first optical fiber 404 and is caused to resonate between the incident-end-surface mirror 407 and the emitting-end-surface mirror 408. This causes the light to be converted into laser light, which is then taken out from the light emitting portion 406 of the first optical fiber 404. The remaining portion of the exciting light 402 is also taken out from the light emitting portion 406 of the first optical fiber 404. Two lights at two wavelengths emitted from the light emitting portion 406 of the first optical fiber 404, are incident upon the second optical fiber 409. Inside of the second optical fiber 409, both lights are absorbed by the Er ions. When the Er ions experience a ground-state absorption of the exciting light 402 at a wavelength in a 800-nm band, the Er ions are excited from a ground state level $^4I_{15/2}$ to a level $^4I_{13/2}$. When the Er ions experience an excited-state absorption of the emission light at a wavelength of 1.47 μm, the Er ions are excited from the level $^4I_{13/2}$ to a level $^4S_{3/2}$. When the Er ions experience a radiative transition from the level $^4S_{3/2}$ to the ground state level $^4I_{15/2}$, there is emitted light at a wavelength of 550 nm. This emission light resonates between the incident-end-surface mirror 412 and the emitting-end-surface mirror 413, causing the light to be converted into laser light. This laser light is emitted, as the output light 415, from the light emitting portion 411 of the second optical fiber 409, and is converted, by the incident lens 414, into a collimated beam, which are then taken out.

Figure 11:
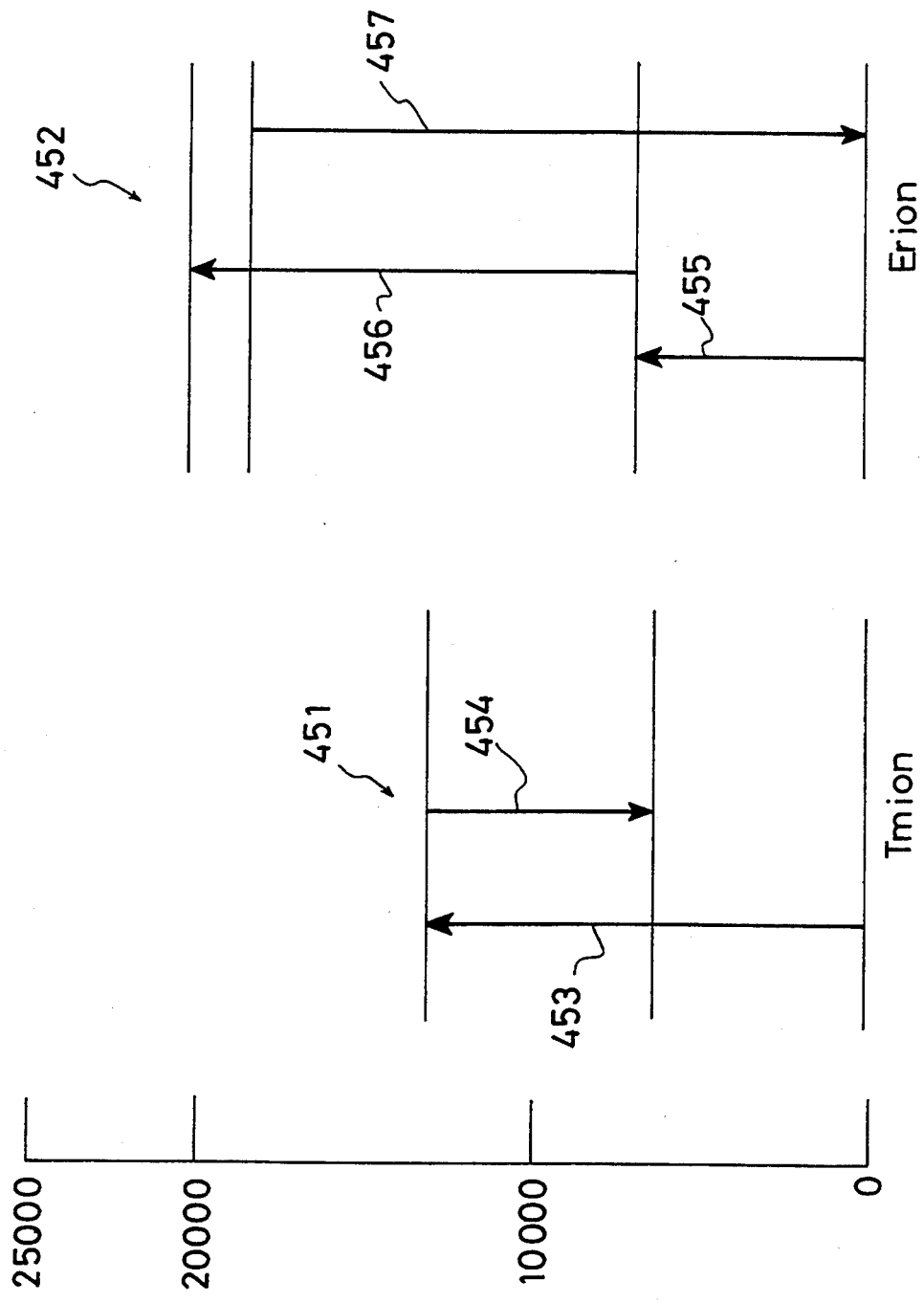
FIG. 11 shows the energy levels of rare earth ions in the rare-earth-ion-doped short-wavelength laser light source apparatus according to the fifth embodiment of the present invention.

FIG. 11 is a view of energy levels of the Tm ions and the Er ions. In FIG. 11, the ordinate shows the level energy of rare earth ions in unit $cm^{-1}$, and there are shown Tm-ion levels 451 and Er-ion levels 452. Also shown in FIG. 11 are a ground-state absorption transition 453 which the Tm ions experience at an excitation wavelength in a 800-nm band, a 1.47 μm-radiative transition 454 which the Tm ions experience, a ground-state absorption transition 455 which the Er ions experience, an excited-state absorption transition 456 which the Er ions experience, and a 525 nm-radiative transition 457 of the Er ions from a level $^4S_{3/2}$ to a ground state level As apparent from FIG. 11, the radiative transition 454 of the Tm ions and the ground-state absorption transition 455 of the Er ions are very similar to each other in view of energy. Also apparent from FIG. 11, the ground-state absorption transition 453 of the Tm ions and the excited-state absorption transition 456 of the Er ions are very similar to each other in view of energy.

Figure 12:
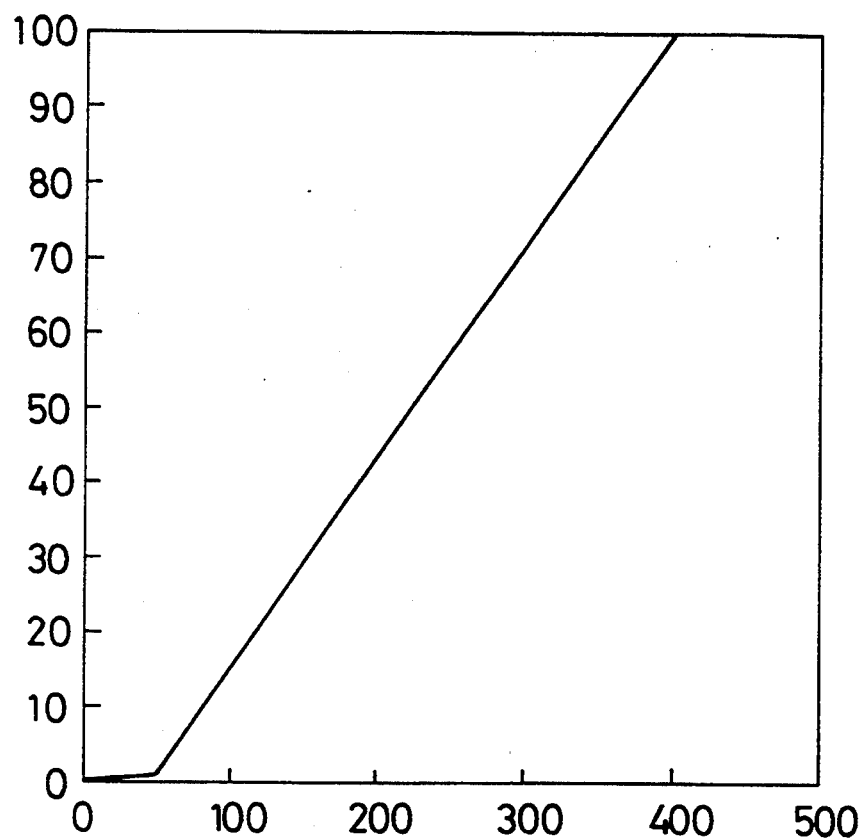
FIG. 12 shows the relationship in power between exciting light and output light in the rare-earth-ion-doped short-wavelength laser light source apparatus according to the fifth embodiment of the present invention.

FIG. 12 shows the relationship in power between the exciting light 402 and the green output light 415 at a wavelength of 550 nm in the rare-earth-ion-doped short-wavelength laser light source apparatus of the fifth embodiment. In FIG. 12, the abscissa shows the power of the exciting light 402, while the ordinate shows the power of the output light 415.

As shown in FIG. 12, the green output light 415 supplied from the second optical fiber 409 at the time when the exciting light 402 of 50 mW is incident upon the first optical fiber 404, reached a threshold value of laser oscillation. Further, the output light efficiency or ratio in power of the output light 415 to the exciting light 402, reached 35%, and there was obtained the output light 415 of which maximum power was equal to 100 mW. In view of the facts that the power of the exciting light 402 at the time when the power of the output light 415 is 100 mW, is 400 mW and that the input coupling efficiency to the first optical fiber 404 is 30%, it is considered that light of 1.2 W is supplied from the pumping source 301. This value can be readily achieved by an AlGaAs semiconductor laser. Accordingly, it is not required to use a large-size solid-state laser as the pumping source 401, thus enabling the short-wavelength laser light source apparatus to be made in a very compact design.

The description has been made of upconversion of the Tm ions in the fourth embodiment and upconversion of the Er ions in the fifth embodiment. However, it is also possible to emit blue light at a wavelength of 490 nm by upconversion of Pr ions. More specifically, Yb ions can be excited with the use, as the pumping source, of a semiconductor laser in the range from a 800-nm band to 980 nm, and upconversion excitation of Pr ions can be achieved with the use of the exciting light and emission light in a 1 μm-band from the Yb ions.

In the fourth and fifth embodiments, there are used the optical fibers made of a fluoride. However, there may also be used other optical-fiber material as far as upconversion can be achieved with such a material. Thus, a bulk material, e.g., a single crystal or glass material, may also be used.

The following description will discuss a rare-earth-ion-doped short-wavelength laser light source apparatus according to a sixth embodiment of the present invention.

Figure 13:
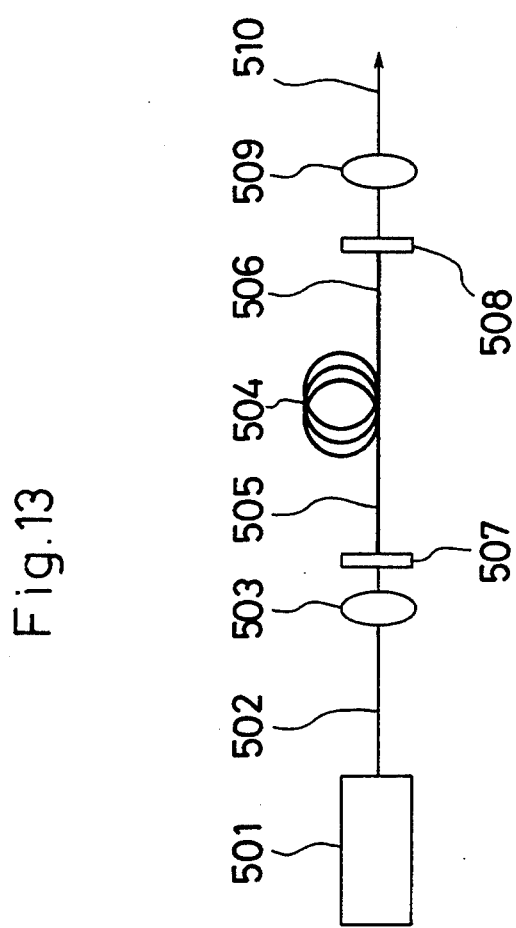
FIG. 13 is a view illustrating the general arrangement of a rare-earth-ion-doped short-wavelength laser light source apparatus according to a sixth embodiment of the present invention.
Figure 14:
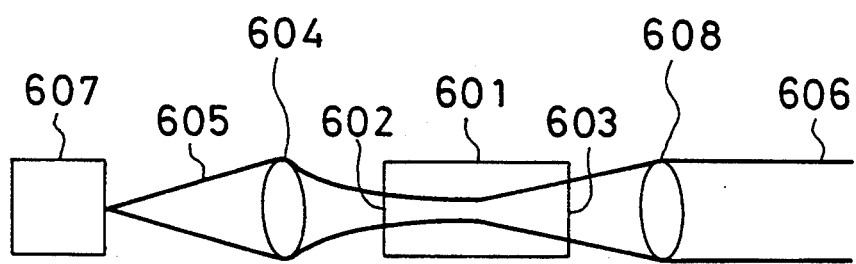
FIG. 14 is a view illustrating the arrangement of a solid-state laser using a conventional rare-earth-ion-doped laser element.
Figure 15:
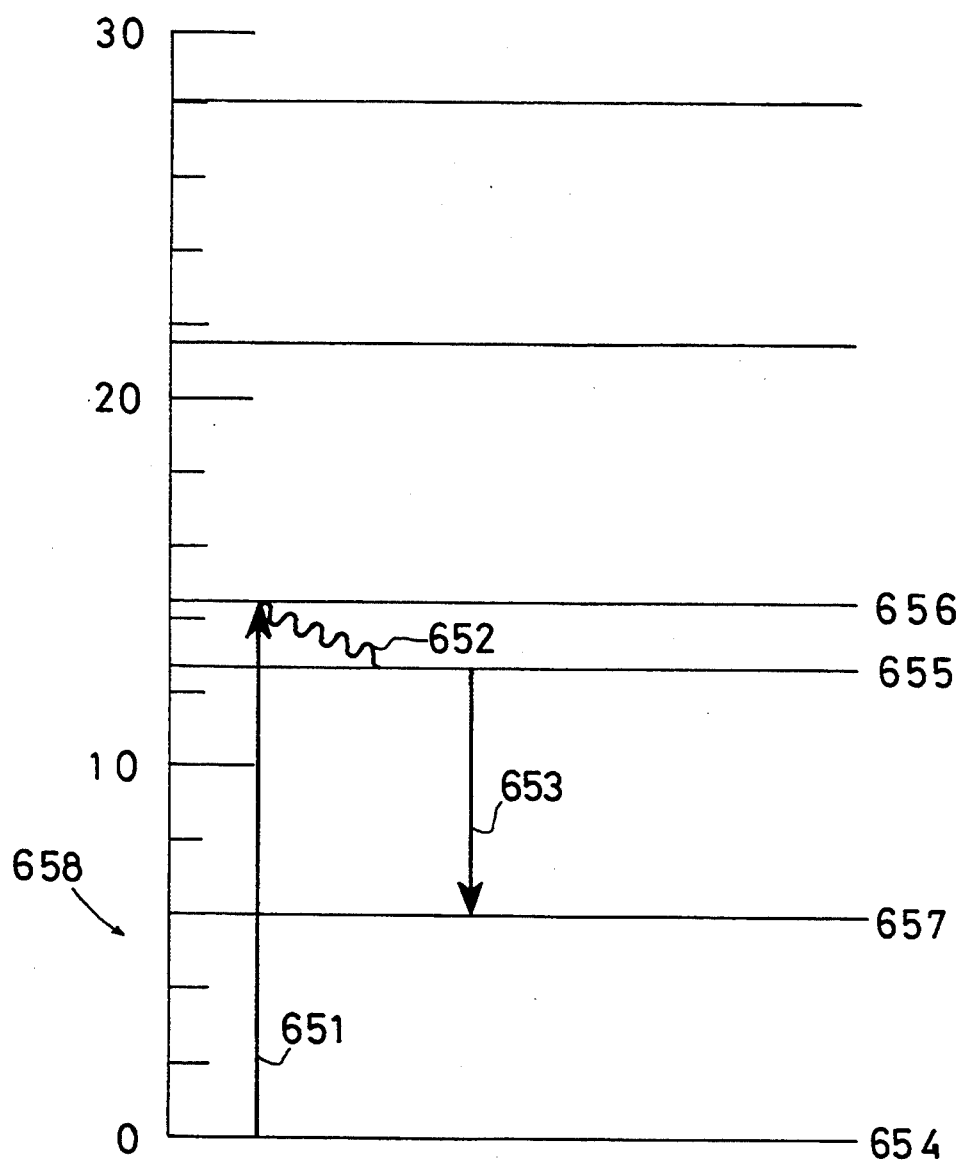
FIG. 15 is a view illustrating an example of the transitions of energy level of rare earth ions in the conventional rare-earth-ion-doped laser element.
Figure 16:
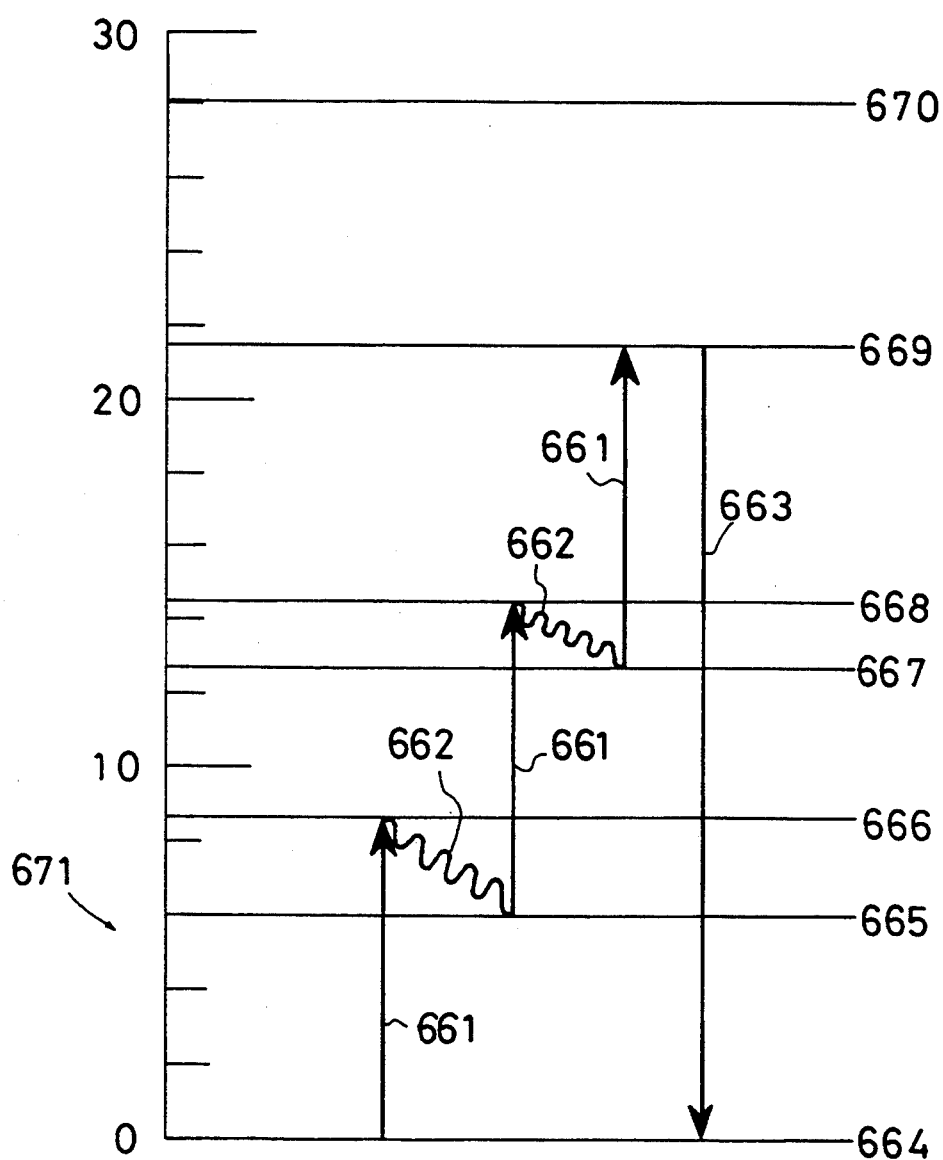
FIG. 16 is a view illustrating another example of the transitions of energy level of rare earth ions in the conventional rare-earth-ion-doped laser element.

FIG. 13 is a view illustrating the general arrangement of a rare-earth-ion-doped short-wavelength laser light source apparatus according to the sixth embodiment. Shown in FIG. 13 are a pumping source 501, exciting light 502 emitted from the pumping source 501, an incident lens 503, an optical fiber 504 made of a fluoride doped with rare earth ions, an incident portion 505 of the optical fiber 504, a light emitting portion 506 of the optical fiber 504, an incident-end-surface mirror 507 of the optical fiber 504, an emitting-end-surface mirror 508 of the optical fiber 504, a light emitting lens 509 and output light 510 emitted from the light emitting lens 509.

In the sixth embodiment, the pumping source 501 is a semiconductor laser device for oscillating laser at a wavelength in a 800-nm band. The exciting light 502 is laser light at a wavelength in a 800-nm band.

In each of the fourth and fifth embodiments, two different optical fibers are respectively doped with first rare earth ions and second rare earth ions, and output light of the first optical fiber is incident upon the second optical fiber. However, in the sixth embodiment, only one optical fiber is used, and this one optical fiber 504 is doped with Nd ions serving as the first rare earth ions and Tm ions serving as the second rare earth ions.

The following description will discuss the operation of the rare-earth-ion-doped short-wavelength laser light source apparatus according to the sixth embodiment.

Exciting light in a 800-nm band is absorbed, at the same time, by the Nd ions and the Tm ions with which the optical fiber 504 was doped. Light in a 1.1 μm-band emitted from the Nd ions is absorbed, as it is, by the Tm ions, or an energy corresponding to 1.1 μm is transferred from the Nd ions to the Tm ions through an ion-to-ion energy transfer between the Nd ions and the Tm ions.

The sixth embodiment produces such an effect as to generate exciting light at a single wavelength, which is one of the objects of the present invention. Further, the arrangement of the sixth embodiment is advantageous in that short-wavelength oscillation can be achieved by one optical fiber 504. Accordingly, the short-wavelength laser light source apparatus can be not only simplified in structure, but also lowerd in cost.

It is a matter of course that one optical fiber can be doped with Tm ions and Er ions as shown in the fifth embodiment, instead of the Nd ions and the Tm ions as in the sixth embodiment.

We claim:

1. A laser element doped with rare earth ions, comprising:

an optical material doped with trivalent Tm ions and other rare earth ions different from said Tm ions, and having a light incident portion and a light emitting portion, wherein said light incident portion and said light emitting portion each have reflectors for reflecting light of a specified wavelength region thereby forming a resonant cavity, and wherein:

said other rare earth ions are excited to an excited state upon absorption of a first laser beam which is oscillated at a wavelength of light that said other rare earth ions absorb and which is incident from said incident portion, enabling said other rare earth ions to experience a radiative transition from said excited state, thereby emitting a first light at a wavelength from 1.0 $\mu$m to 1.2 $\mu$m;

said Tm ions are brought through a series of transitions comprising: (i) a first transition to a first excited state level from a ground state level and (ii) a second transition to a second excited state level from said first excited state level;

said Tm ions experience a radiative transition from said second excited state level to an energy level lower than said first excited state level, thereby emitting a second light which leaves from said light emitting portion as a second laser beam; and said Tm ions exhibit population inversion between said second excited state level and said energy level lower than said first excited state level.

2. A laser element doped with rare earth ions according to claim 1, wherein said optical material is an optical fiber having (i) a core presenting a high optical refractive index and (ii) a clad portion surrounding said core and presenting an optical refractive index lower than that of said core, said core being doped with the Tm ions and said other rare earth ions.

3. A laser element doped with rare earth ions according to claim 1, wherein said other rare earth ions are Nd ions.

4. A laser element doped with rare earth ions according to claim 1, wherein said optical material is made of a raw material of any of a fluoride type, a SiO$_2$ type, and a halide type.

5. A laser element doped with rare earth ions according to claim 1, wherein said second laser beam has a wavelength in a range of any of 680 nm +/−20 nm and 810 +/−20 nm.

6. The laser element according to claim 1, wherein said Tm ions are brought through any of said transitions by absorbing said first light emitted from said other rare earth ions.

7. The laser element according to claim 1, wherein said Tm ions are brought through any of said transitions by being transferred an amount of energy from said other rare earth ions as excited.

8. A laser element doped with rare earth ions, comprising:

an optical material doped with trivalent Tm ions, and having a light incident portion and a light emitting portion, wherein said light incident portion and said light emitting portion each have reflectors for reflecting light of a specified wavelength region thereby forming a resonant cavity, and wherein:

said other rare earth ions are excited to an excited state upon absorption of a first laser beam which is oscillated at a wavelength of light that said other rare earth ions absorb and which is incident from said incident portion, enabling said other rare earth ions to experience a radiative transition from said excited state, thereby emitting a first light at a wavelength from 1.0 $\mu$m to 1.2 $\mu$m;

said Tm ions are brought through a series of transitions comprising (i) a first transition to a first excited state level from a ground state level, (ii) a second transition to a second excited state level from said first excited state level, and (iii) a third transition to a third excited state level from said second excited state level;

said Tm ions experience a radiative transition from said third excited state level to an energy level lower than said first excited state level, emitting a second light which leaves from said light emitting portion as a second laser beam; and said Tm ions exhibit population inversion between said third excited state level and said energy level lower than said first excited state level.

9. A laser element doped with rare earth ions according to claim 8, wherein said optical material is an optical fiber having (i) a core presenting a high optical refractive index and (ii) a clad portion surrounding said core and presenting an optical refractive index lower than that of said core, said core being doped with the Tm ions and said other rare earth ions.

10. A laser element doped with rare earth ions according to claim 8, wherein said other rare earth ions are Nd ions.

11. A laser element doped with rare earth ions according to claim 8, wherein said optical material is made of a raw material of any of a fluoride type, a SiO$_2$ type, and a halide type.

12. A laser element doped with rare earth ions according to claim 8, wherein said second laser has a wavelength in a range of any of 680 nm +/−20 nm and 810 +/−20 nm.

13. The laser element according to claim 8, wherein said Tm ions are brought through any of said transitions by absorbing said first light emitted from said other rare earth ions.

14. The laser element according to claim 8, wherein said Tm ions are brought through any of said transitions by being transferred an amount of energy from said other rare earth ions as excited.

15. An optical amplifier element doped with rare earth ions, comprising:

an optical material doped with trivalent Tm ions and other rare earth ions different from said Tm ions, and having a light incident portion and a light emitting portion, wherein said light incident portion and said light emitting portion each have reflectors for reflecting light of a specified wavelength region thereby forming a resonant cavity, and wherein:

said other rare earth ions are excited to an excited state upon absorption of a laser beam which is oscillated at a wavelength of light that said other rare earth ions absorb and which is incident from said incident portion, enabling said other rare earth ions to experience a radiative transition from an excited state, thereby emitting a first light at a wavelength from 1.0 $\mu$m to 1.2 $\mu$m;

said Tm ions are brought through a series of transitions comprising: (i) a first transition to a first excited state level from a ground state level and (ii) a second transition to a second excited state level from said first excited state level;

said Tm ions exhibit population inversion between said second excited state level and an energy level lower than said first excited state level, and an amplified light which is incident from said incident portion and which is amplified in said resonant cavity leaves from said light emitting portion.

16. An optical amplifier element doped with rare earth ions according to claim 15, wherein said optical material is an optical fiber having (i) a core presenting a high optical refractive index and (ii) a clad portion surrounding said core and presenting an optical refractive index lower than that of said core, said core being doped with the Tm ions and said other rare earth ions.

17. An optical amplifier element doped with rare earth ions according to claim 15, wherein said other rare earth ions are Nd ions.

18. An optical amplifier element doped with rare earth ions according to claim 15, wherein said optical material is made of a raw material of any of a fluoride type, a $SiO_2$ type, and a halide-type.

19. An optical amplifier element doped with rare earth ions according to claim 15, wherein said amplified light has a wavelength in a range of any of 680 nm +/−20 nm and 810 +/−20 nm.

20. The laser element according to claim 15, wherein said Tm ions are brought through any of said transitions by absorbing said first light emitted from said other rare earth ions.

21. The laser element according to claim 15, wherein said Tm ions are brought through any of said transitions by being transferred an amount of energy from said other rare earth ions as excited.

22. An optical amplifier element doped with rare earth ions, comprising:

an optical material doped with trivalent Tm ions and other rare earth ions different from said Tm ions, and having a light incident portion and a light emitting portion, wherein said light incident portion and said light emitting portion each have reflectors for reflecting the light of a specified wavelength region thereby forming a resonant cavity, said other rare earth ions are excited to an excited state upon absorption of a laser beam which is oscillated at a wavelength of light that said other rare earth ions absorb and which is incident from said incident portion, enabling said other rare earth ions to experience a radiative transition from said excited state, thereby emitting a light at a wavelength from 1.0 $\mu$m to 1.2 $\mu$m;

said Tm ions are brought through a series of transitions, comprising: (i) a first transition to a first excited state level from a ground state level, (ii) a second transition to a second excited state level from said first excited state level, and (iii) a third transition to a third excited state level from said second excited state level;

said Tm ions exhibit population inversion between said third excited state level and an energy level lower than said first excited state level; and an amplified light which is incident from said incident portion and which is amplified in said resonant cavity leaves from said light emitting portion.

23. An optical amplifier element doped with rare earth ions according to claim 22, wherein said optical material is an optical fiber having (i) a core presenting a high optical refractive index and (ii) a clad portion surrounding said core and presenting an optical refractive index lower than that of said core, said core being doped with the Tm ions and said other rare earth ions.

24. An optical amplifier element doped with rare earth ions according to claim 22, wherein said other rare earth ions are Nd ions.

25. An optical amplifier element doped with rare earth ions according to claim 22, wherein said optical material is made of a raw material of any of a fluoride type, a $SiO_2$ type, and a halide type.

26. An optical amplifier element doped with rare earth ions according to claim 22, wherein said amplified light has a wavelength in a range of any of 680 nm +/−20 nm and 810 +/−20 nm.

27. The laser element according to claim 22, wherein said Tm ions are brought through any of said transitions by absorbing said light emitted from said other rare earth ions.

28. The laser element according to claim 22, wherein said Tm ions are brought through any of said transitions by being transferred an amount of energy from said other rare earth ions as excited.

29. A rare-earth-ion-doped short-wavelength laser light source apparatus comprising:

a pumping source for emitting a pump light at a first wavelength;

a first optical material doped with first rare earth ions which experience an absorption transition by said pump light, thereby emitting light of a second wavelength, said first optical material having (i) a first incident portion upon which said pump light emitted from said pumping source is incident, and (ii) a first light emitting portion for emitting said pump light and an emission light emitted from said first rare earth ions;

a second optical material doped with second rare earth ions which experience: a ground-state absorption transition by said pump light, an excited-state absorption transition to an upper transition level by said light of said second wavelength, and a radiative transition from said upper transition level of said excited-state absorption transition, thereby emitting light of a third wavelength, wherein said second optical material has (i) a second incident portion upon which said pump light and said emission light emitted from said first light emitting portion are incident, and (ii) a second light emitting portion from which said light of said third wavelength is emitted is a laser beam, wherein said second incident portion and said second light emitting portion each have reflectors for reflecting light of a specified wavelength region thereby forming a resonant cavity.

30. A rare-earth-ion-doped short-wavelength laser light source apparatus according to claim 29, wherein said first rare earth ions are any of trivalent Yb ions and trivalent Nd ions, and said second rare earth ions are trivalent Tm ions.

31. A rare-earth-ion-doped short-wavelength laser light source apparatus according to claim 29, wherein said first rare earth ions are trivalent ions and said second rare earth ions are trivalent Er ions.

32. A rare-earth-ion-doped short-wavelength laser light source apparatus according to claim 29, wherein said first rare earth ions are trivalent Yb ions and said second rare earth ions are trivalent Pr ions.

33. A rare-earth-ion-doped short-wavelength laser light source apparatus comprising:

a pumping source for emitting a pump light of a first wavelength; and an optical material doped with first rare earth ions and second rare earth ions, wherein said first rare earth ions experience an absorption transition by said pump light, thereby emitting light of a second wavelength, and said second rare earth ions experience a ground-state absorption transition by said pump light, an excited-state absorption transition to an upper transition level by said light of said second wavelength, and a radiative transition from said upper transition level of said excited-state absorption transition, thereby emitting a light of a third wavelength, and wherein:

said optical material has (i) an incident portion upon which said pump light emitted from said pumping source is incident, and (ii) a light emitting portion from which said light of said third wavelength is emitted as a laser beam, and said incident portion and said light emitting portion each have reflectors for reflecting light of a specified wavelength region thereby forming a resonant cavity.

34. A rare-earth-ion-doped short-wavelength laser light source apparatus according to claim 33, wherein said first rare earth ions are any of trivalent Yb ions and trivalent Nd ions, and said second rare earth ions are trivalent Tm ions.

35. A rare-earth-ion-doped short-wavelength laser light source apparatus according to claim 33, wherein said first rare earth ions are trivalent Tm ions and said second rare earth ions are trivalent Er ions.

36. A rare-earth-ion-doped short-wavelength laser light source apparatus according to claim 33, wherein said first rare earth ions are trivalent Yb ions and said second rare earth ions are trivalent Pr ions.

* * * * *